(12) United States Patent
Shiozaki et al.

(10) Patent No.: US 8,011,477 B2
(45) Date of Patent: Sep. 6, 2011

(54) MOTORCYCLE POWER UNIT

(75) Inventors: Tomoo Shiozaki, Saitama (JP);
Masahiro Shimizu, Saitama (JP);
Osamu Emizu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 979 days.

(21) Appl. No.: 11/980,585

(22) Filed: Oct. 31, 2007

(65) Prior Publication Data

US 2008/0156560 A1 Jul. 3, 2008

(30) Foreign Application Priority Data

Dec. 28, 2006 (JP) .................................. 2006-354358

(51) Int. Cl.
*F01M 1/04* (2006.01)
*F01M 1/00* (2006.01)
*B62D 61/02* (2006.01)
*B62K 11/00* (2006.01)
*B62M 11/00* (2006.01)

(52) U.S. Cl. .............. 184/6.5; 184/6; 184/106; 180/219
(58) Field of Classification Search ............... 184/6, 6.5, 184/6.6, 6.7, 6.8, 3.2; 180/219, 230
See application file for complete search history.

(56) References Cited

U.S. PATENT DOCUMENTS

| | | | | |
|---|---|---|---|---|
| 4,834,219 A | * | 5/1989 | Inagaki et al. | ................. 184/6.5 |
| 7,823,684 B2 | * | 11/2010 | Shiozaki et al. | ............. 180/292 |
| 2002/0043237 A1 | * | 4/2002 | Nomura et al. | ........... 123/196 R |
| 2008/0268992 A1 | * | 10/2008 | Mitsubori et al. | .............. 474/17 |
| 2008/0314677 A1 | * | 12/2008 | Shiozaki et al. | .............. 180/366 |
| 2008/0314687 A1 | * | 12/2008 | Shiozaki et al. | ............... 184/6.5 |

FOREIGN PATENT DOCUMENTS

| | | |
|---|---|---|
| JP | 58-102855 A | 6/1983 |
| JP | 58-150664 U | 10/1983 |
| JP | 61-57117 U | 4/1986 |
| JP | 63-062958 A | 3/1988 |
| JP | 64-11312 U | 1/1989 |
| JP | 02-011966 A | 1/1990 |
| JP | 09-256830 A | 9/1997 |
| JP | 10-238327 A | 9/1998 |
| JP | 2002-357265 A | 12/2002 |

* cited by examiner

*Primary Examiner* — William A Rivera
*Assistant Examiner* — Robert T Reese
(74) *Attorney, Agent, or Firm* — Birch, Stewart, Kolasch & Birch, LLP

(57) ABSTRACT

An internal combustion engine includes a continuously variable transmission chamber formed of a crank case and a cover member connected to the crank case to permit the use of oil different between the internal combustion engine and the continuously variable transmission. Thereafter, a sufficient amount of each oil is ensured to not reduce the lowest road clearance. A division wall divides an interior of an oil pan into an internal combustion engine side oil reservoir and a continuously variable transmission side oil reservoir that reserves oil for lubrication of a continuously variable transmission and for speed control thereof, and which is connected to a lower portion of a crank case. The continuously variable transmission side oil reservoir is formed in a width direction of the motorcycle wherein part of continuously variable transmission side oil reservoir expands more outwardly than a continuously variable transmission chamber.

20 Claims, 14 Drawing Sheets

MOTORCYCLE POWER UNIT

CROSS-REFERENCE TO RELATED APPLICATIONS

The present application claims priority under 35 USC 119 to Japanese Patent Application No. 2006-354358 filed on Dec. 28, 2006 the entire contents thereof is hereby incorporated by reference.

BACKGROUND OF THE INVENTION

1. Field of the Invention

The present invention relates to a motorcycle power unit including: an internal combustion engine having an oil pan connected to a lower portion of a crank case that rotatably supports a crank shaft and a continuously variable transmission that continuously varies rotational power of the crank shaft to transmit the resultant rotational power to a rear wheel. In the motorcycle power unit, a crank chamber that contains the major part of the crank shaft is formed in the crank case, while a continuously variable transmission chamber that contains the continuously variable transmission is formed of the crank case and of a cover member connected to the crankcase.

2. Description of Background Art

In Japanese Patent Application Laid-Open Publication No. Hei 10-238327, a motorcycle power unit is disclosed that includes an internal combustion engine and a gear transmission that varies an output of the internal combustion engine to transmit the output to a rear wheel. In the motorcycle power unit, an oil pan, which reserves lubrication oil to be supplied to each lubrication portion of the internal combustion engine and the gear transmission, is connected to a crank case.

In addition, in Japanese Patent Application Laid-Open Publication No. 2002-357265 a motorcycle power unit is known wherein an oil pan, which reserves oil for lubrication of a continuously variable transmission and for speed control thereof, is connected to a crank case that contains the continuously variable transmission.

As disclosed in Japanese Patent Application Laid-Open Publication No. Hei 10-238327, in a case of sharing oil for use in the lubrication portion of the internal combustion engine with oil for use in the transmission side, one kind of oil may be sufficient. However, depending on the kind of transmission, there is a case in which a kind of oil different from that used in the lubrication portion of the internal combustion engine should be used in the transmission side in order to make full use of a characteristic of the transmission.

In view of the above point, Japanese Patent Application Laid-Open Publication No. 2002-357265 discloses the use of an oil pan dedicated to the transmission. However, if this technique is simply applied to a motorcycle, an oil pan for the internal combustion engine side and a other oil pan for the continuously variable transmission side are needed. Concurrently, parts for connecting each of both oil pans to the crank case are required. As a result, an increase occurs in the number of parts. Moreover, special ideas are required for the shape of the oil pan, in the case of ensuring a different amount of oil for each of the internal combustion engine side and the continuously variable transmission side in the motorcycle with the limited space.

SUMMARY AND OBJECTS OF THE INVENTION

The present invention has been made with consideration given to the aforementioned circumstances. It is an object of an embodiment of the present invention is to provide a motorcycle power unit in which an increase in the number of parts is prevented, while use of oil different between an internal combustion engine and a continuously variable transmission is made possible. Thereafter, a sufficient amount of each oil is ensured not to reduce the lowest road clearance.

In order to achieve the aforementioned object, according to an embodiment of the present invention, a motorcycle power unit includes an internal combustion engine having an oil pan connected to a lower portion of a crank case that rotatably supports a crank shaft and a continuously variable transmission that continuously varies rotational power of the crank shaft to transmit the resultant rotational power to a rear wheel side. In the motorcycle power unit, a crank chamber that contains the crank shaft is formed in the crank case and a continuously variable transmission chamber that contains the continuously variable transmission is formed of the crank case and of a cover member connected to the crank case. In addition, in the motorcycle power unit, the oil pan has a division wall, which divides an interior of the oil pan into two parts, that is, an internal combustion engine side oil reservoir that reserves oil for each lubrication portion of the internal combustion engine, and a continuously variable transmission side oil reservoir that reserves oil for lubrication of the continuously variable transmission and for speed control thereof. Here, the division wall is connected to the lower portion of the crank case. Moreover, in the motorcycle power unit, the continuously variable transmission chamber liquid-tightly isolated from the crank chamber is communicated with the continuously variable transmission side oil reservoir, and the continuously variable transmission side oil reservoir is formed in such a way that part of the continuously variable transmission side oil reservoir expands more outward than the continuously variable transmission chamber in a width direction of the motorcycle.

Furthermore, with respect to a second embodiment of the present invention, the continuously variable transmission side oil reservoir is placed to be shifted to a right or left side from a central line of a vehicle body at the center in a width direction of the motorcycle. The continuously variable transmission side oil reservoir is formed in such a way to expand part of the continuously variable transmission side oil reservoir more outwardly than the continuously variable transmission chamber at the shifted side from the central line of the vehicle body.

With respect to an embodiment of the present invention, the continuously variable transmission includes a drive pulley mounted on a drive pulley shaft to which rotational power from the crank shaft is transmitted. A driven pulley is mounted on a driven pulley shaft having an axis parallel to the drive pulley shaft with a belt wound around the drive pulley and the driven pulley. The continuously variable transmission is configured in such a way that a radius of the belt to be wound around the pulley and the driven pulley is changed, so that power transmission to the driven pulley shaft from the drive pulley shaft is continuously varied. An oil pump is connected to one end of the drive pulley shaft and is provided on a wall portion of one end side along an axial direction of the drive pulley shaft, of an outer wall of the continuously variable transmission chamber, in such a way to pump up oil in the continuously variable transmission side oil reservoir. In addition, the continuously variable transmission side oil reservoir is formed in such a way to expand part of the continuously variable transmission side oil reservoir more outwardly than the wall portion on which the oil pump is provided.

With respect to an embodiment of the present invention, the continuously variable transmission side oil reservoir is formed in such a way to expand its part more outwardly than the continuously variable transmission chamber within the range of a bank angle, which is determined by steps formed on both sides of the motorcycle.

With respect to an embodiment of the present invention, the center of the continuously variable transmission side oil reservoir along a width direction of the motorcycle is located on one side from a central line of the vehicle body at the center along the width direction thereof. The continuously variable transmission is placed at a position shifted to another side from the central line of the vehicle body.

With respect to an embodiment of the present invention, a gauge hole, which allows a level gauge for checking an amount of oil reserved in the continuously variable transmission side oil reservoir to be detachably fitted into a ceiling wall portion of the continuously variable transmission side oil reservoir is formed on a portion that expands more outward than the continuously variable transmission chamber of the continuously variable transmission side oil reservoir.

With respect to an embodiment of the present invention, a suction oil passage, which guides oil in the continuously variable transmission side oil reservoir to the oil pump, is formed on an outer side surface of the wall portion of the outer wall of the continuously variable transmission chamber. The suction oil passage is also formed from the portion that expands more outwardly than the continuously variable transmission chamber of the continuously variable transmission side oil reservoir, to the oil pipe.

Moreover, with respect to an embodiment of the present invention, a groove, which is open to one side and the lower portion of the oil pan, is formed on the oil pan, at a portion where the division wall is formed.

According to an embodiment of the present invention, the interior of the oil pan to be connected to the crank case is divided into two parts, that is, the internal combustion engine side oil reservoir, and the continuously variable transmission side oil reservoir. The continuously variable transmission chamber liquid-tightly isolated from the crank chamber is communicated with the continuously variable transmission side oil reservoir. Thus, an increase in the number of parts is prevented by avoiding the number of oils pans from becoming two or more, while using oil different between the internal combustion engine and the continuously variable transmission. In addition, an increase in weight of the motorcycle is avoided, thereby making it possible to contribute to improving kinematical performance. Furthermore, the division wall formed on the oil pan allows an increase in rigidity of the oil pan that tends to increase in size in order to ensure the amount of oil for internal combustion engine and that of oil for the continuously variable transmission. Still further, if the size of the oil pan is increased downwardly in order to sufficiently ensure the amount of oil, an influence is exerted on the lowest road clearance of the motorcycle. However, the continuously variable transmission side oil reservoir is formed in such a way to expand the part of the continuously variable transmission side oil reservoir more outwardly than the continuously variable transmission chamber in the width direction of the motorcycle. Thus, it is possible to prevent a reduction in the lowest road clearance, while ensuring the volume of the oil pan sufficiently. This makes it possible to efficiently place the oil pan in the limited space of the motorcycle.

According to an embodiment of the present invention, the center of the continuously variable transmission side oil reservoir along the width direction of the motorcycle is located to be shifted to one side of the right and left sides from the central line C1 of the vehicle body. The continuously variable transmission side oil reservoir expands more outwardly than the continuously variable transmission chamber on the side where the shift has occurred. Thus, it is possible to ensure the space at the lower portion of the crank case on the other side of the right and left sides from the central line of the vehicle body and to provide the exhaust pipes and the like. This makes it possible to prevent the exhaust pipes and the like from expanding outwardly from the crank case with an increase in size of the oil pan, when the size of the oil pan is increased in the width direction of the motorcycle to ensure the capacity.

According to an embodiment of the present invention, one end of the drive pulley shaft is connected to the first oil pump provided on the left cover member serving as the wall portion of the one end side of the drive pulley shaft of the outer wall of the continuously variable transmission chamber. The continuously variable transmission side oil reservoir is formed to expand more outwardly than the upper portion of the left cover member on which the first oil pump is provided, thereby making it possible to share the shaft between the oil pump and the drive pulley to reduce the number of parts. In addition, the oil pump is provided on the shaft end of the drive pulley shaft and the wall portion, thereby facilitating assembly. Moreover, the oil pump is placed within the width of the continuously variable transmission side oil reservoir, thereby making it possible to simplify the passage connecting between the continuously variable transmission side oil reservoir and the oil pump as a straight line, and to facilitate the formation of the suction oil passage.

According to an embodiment of the present invention, the continuously variable transmission side oil reservoir is formed to expand more outwardly than the continuously variable transmission chamber within the range of the bank angle, which is determined by the steps formed on both sides of the motorcycle. Thus, no influence is exerted on the bank angle, even when the part of the continuously variable transmission side oil reservoir is formed to expand.

According to an embodiment of the present invention, the center, which is along the width direction of the continuously variable transmission side oil reservoir, and the continuously variable transmission are separately provided. Thus, it is possible to prevent a heavy load from being placed to be biased to one side in the width direction of the motorcycle.

According to an embodiment of the present invention, the gauge hole, into which the level gauge is detachably fitted, is formed on the expanded portion. Thus, it is possible to facilitate insertion and removal of the level gauge without the wall portion being treated as an interruption at the time of inserting and removing the level gauge. Here, it is also possible to similarly facilitate operation, when oil is supplied to the continuously variable transmission side oil reservoir using the gauge hole.

According to an embodiment of the present invention, the suction oil passage, which guides oil in the continuously variable transmission side oil reservoir to the oil pump, is formed on the outer side surface of the wall portion. This outer side surface is a surface where the oil pump is formed of the outer wall of the continuously variable transmission chamber from the expanded portion to the oil pipe. This makes it unnecessary to form the suction oil passage connecting between the continuously variable transmission side oil reservoir and the oil pump. Thus, the formation of the suction oil passage is facilitated, and concurrently a reduction in degree of freedom, concerning the arrangement of parts in the crank case can be prevented.

According to an embodiment of the present invention, the groove formed on the oil pan makes it possible to increase a surface area of the oil pan, and to improve coolability. This groove is provided to correspond to the division wall that divides the internal combustion engine side oil reservoir and the continuously variable transmission side oil reservoir. This makes it possible to supply cooling air to substantially the whole circumference of the outer walls of both oil reservoirs and to obtain more excellent cooling effect.

Thus, although the embodiment of the present invention has been explained above, the present invention is not limited to the aforementioned embodiment and various changes in design can be possible without departing from the present invention described in the claims.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The following will explain the specific form of the present invention based on one embodiment of the present invention illustrated in the accompanying drawings.

It should be noted that back-and-forth and right-and-left directions in this embodiment refer to directions in a state where a motorcycle is directed forward in the direction of travel thereof.

Figure 1:
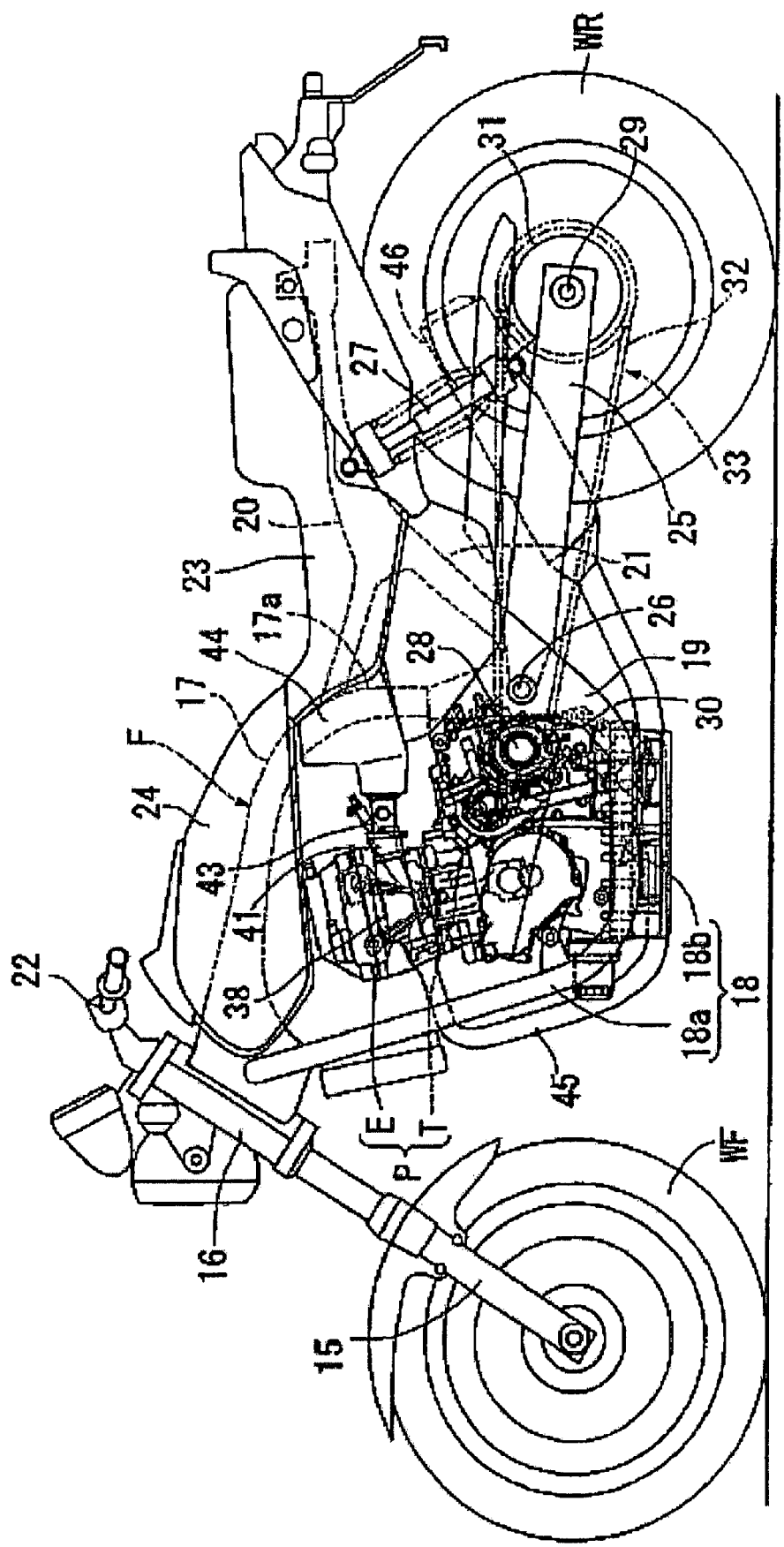
FIG. 1 is a left side view of a motorcycle.

As illustrated in FIG. 1, a vehicle body frame F of a motorcycle includes a head pipe 16 that steerably supports a front fork 15 that pivotably supports a front wheel WF at its lower end portion. A main frame 17 extends back from the head pipe 16 and curves and extends downwardly to have a drooping portion 17a on its back portion. A pair of right and left down frames 18, which have an inclined portion 18a inclined downward from the head pipe 16 and a horizontal portion 18b extending back from a back portion of the inclined portion 18a, are placed at the lower portion of the main frame 17. A pivot plate 19 mutually connects a rear end of the horizontal portion 18b of the down frames 18 to a lower end of the drooping portion 17a of the main frame 17. A pair of right and left sheet rails 20 extend back from a top portion of the drooping portion 17a of the main frame 17 with a pair of right and left connecting frames 21 that connect an intermediate portion between the pivot plate 19 and both sheet rails 20.

Handlebars 22 are connected to an upper end of the front fork 15, a driver seat 23 is formed on the seat rails 20, and a fuel tank 24 is attached to the main frame 17 to stride over the main frame 17 at the front portion of the driver seat 23.

The major part of a power unit P, which is composed of an in-line four-cylinder internal combustion engine E supported by the down frames 18 and the pivot plate 19, and which is also composed of a power transmission device T that changes speed and reduces speed to transmit power of the internal combustion engine E to a rear wheel WR, is placed at a portion surrounded by the main frame 17 and the down frames 18.

In addition, on the pivot plate 19, a front end portion of each of swing arms 25, which pivotably support the rear wheel WR at their rear end portions, is swingably supported through a spindle 26. A rear shock absorber unit 27 is provided between the sheet rails 20 and the swing arms 25.

Between an output shaft 28 provided in the power unit P and an axle 29 of the rear wheel WR, there is formed a chain drive means 33, which is composed of a drive sprocket 30 mounted on the output shaft 28, a driven sprocket 31 fixed to the axle 29, and an endless chain 32 that is wound around the drive sprocket 30 and the driven sprocket 31.

Figure 2:
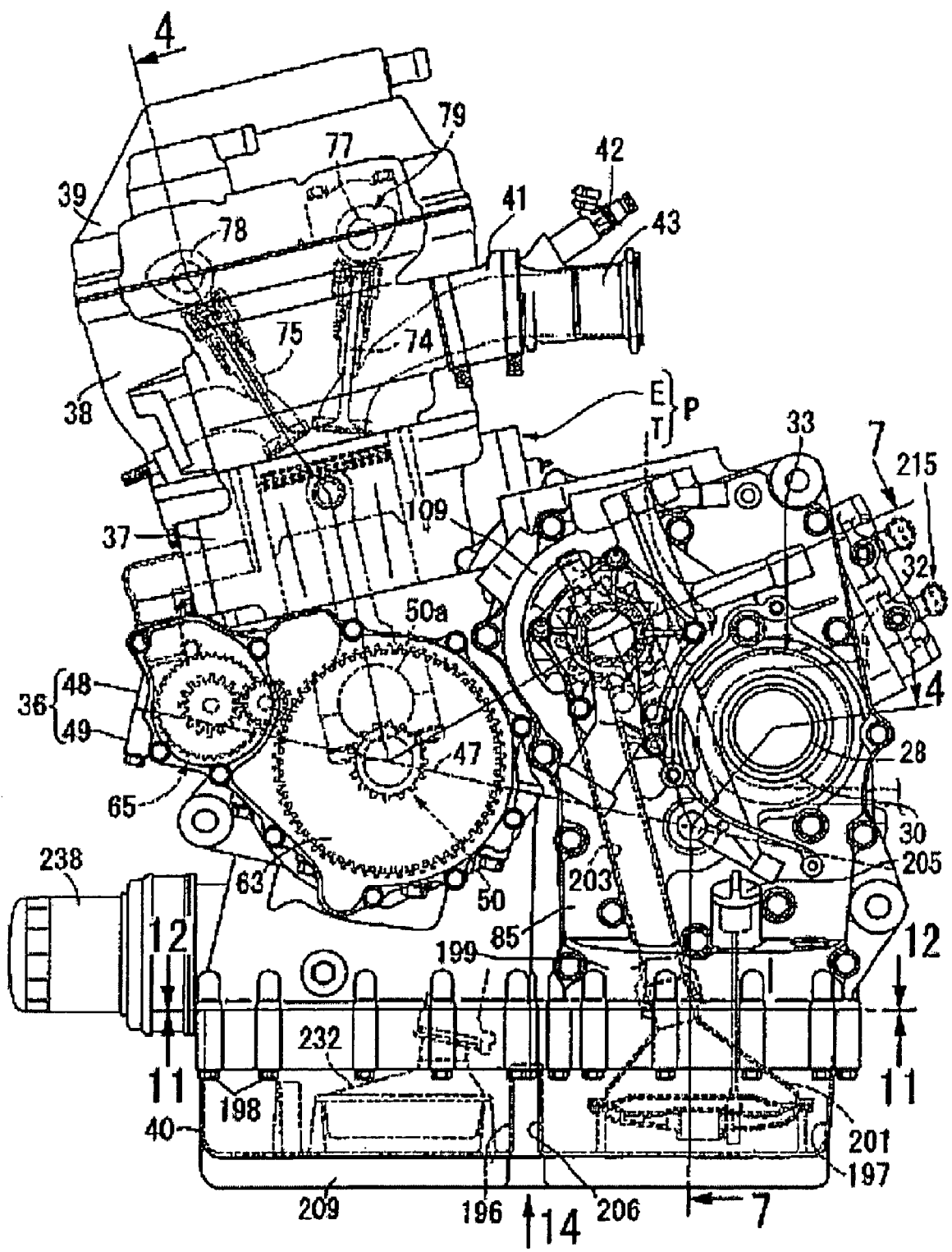
FIG. 2 is a left side view of a power unit.
Figure 3:
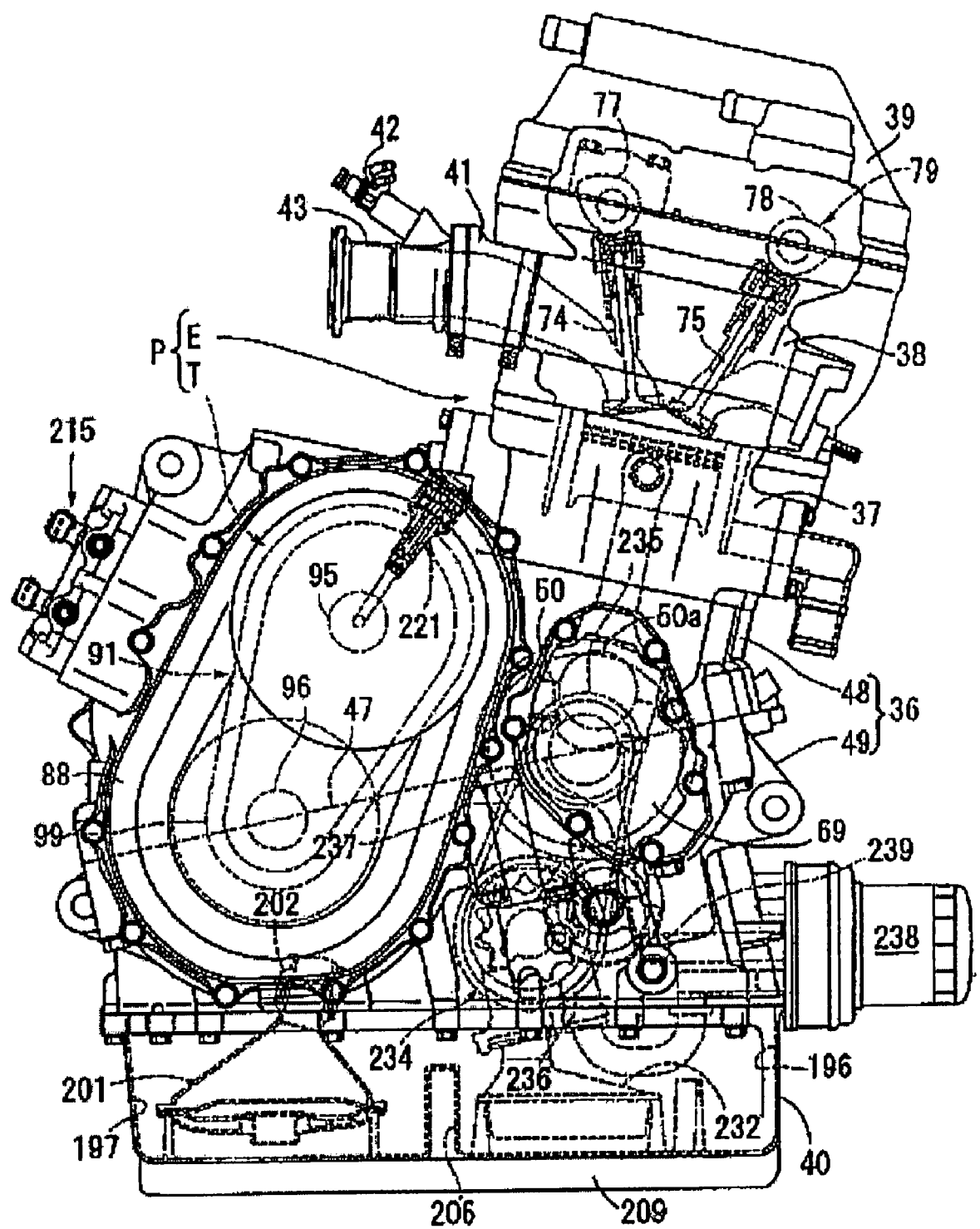
FIG. 3 is a right side view of a power unit.

In FIGS. 2 and 3, the internal combustion engine E includes a crank case 36, a cylinder block 37 connected to an upper portion of the crank case 36, a cylinder head 38 connected to an upper end of the cylinder block 37, a head cover 39 connected to the cylinder head 38 and an oil pan 40 connected to a lower portion of the crank case 36.

An upstream end of each of suction pipes 41, which are connected to a back side surface of the cylinder head 38 to correspond to each cylinder, is connected to each of throttle bodies 43 each having a fuel injection valve 42. An upstream end of each of the throttle bodies 43 is connected to an air cleaner 44 (see FIG. 1), which is provided at the left side of the vehicle body frame F and at the back upper portion of the power unit P. Moreover, each of exhaust pipes 45, which are connected to a front side surface of the cylinder head 38 to correspond to each cylinder, extends back through a right side lower portion of the power unit and is connected to an exhaust muffler 46, which is disposed at a right side of the rear wheel WR as shown in FIG. 1.

The crank case 36 is formed by connecting an upper case half body 48 and a lower case half body 49 to each other at a connected surface 47 inclined upwardly and forwardly. A crank shaft 50, having an axis along a width direction of the motorcycle, is supported to be rotatable between the upper case half body 48 and the lower case half body 49.

Figure 4:
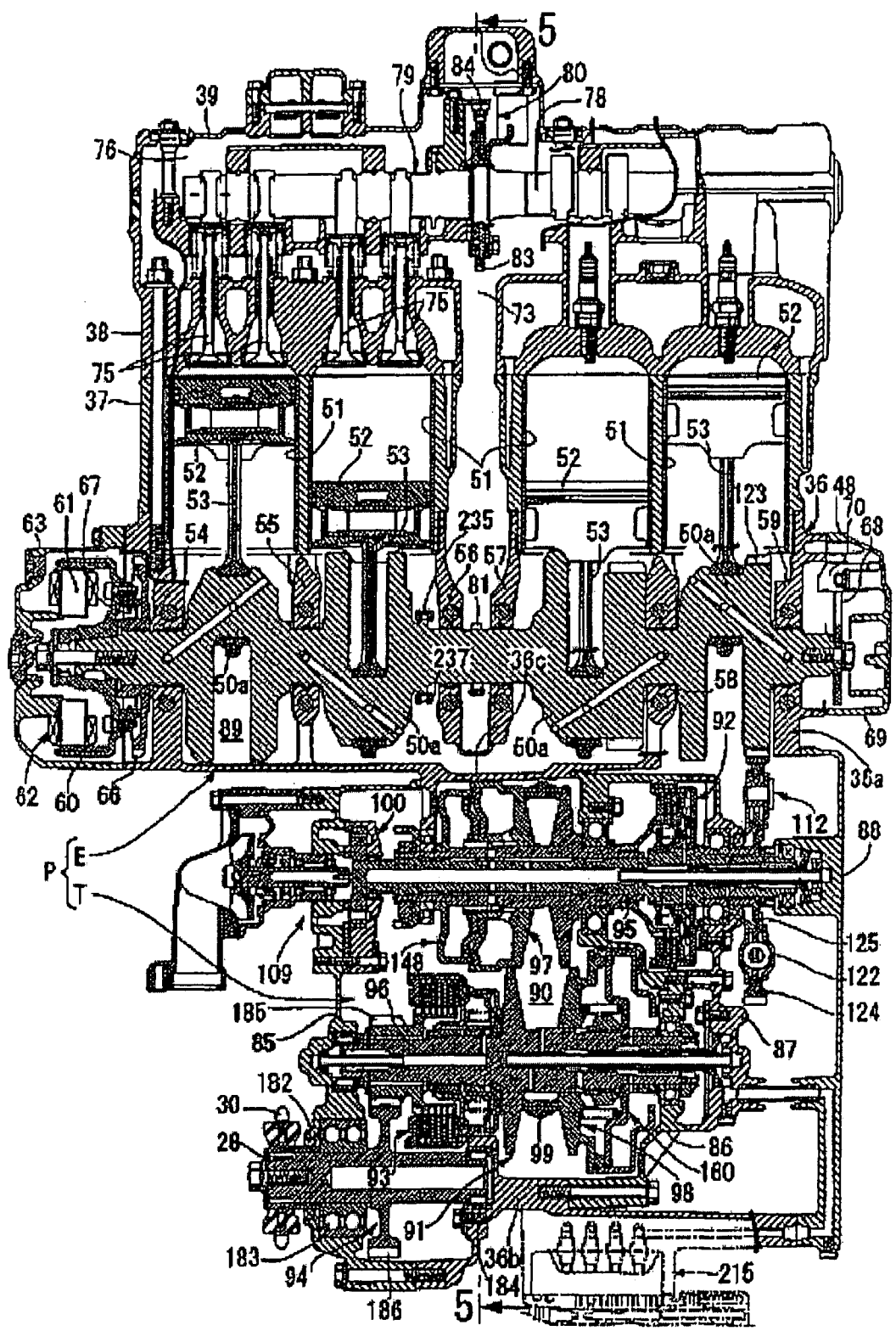
FIG. 4 is a cross-sectional view taken along the line of 4-4 in FIG. 2.

With reference to FIG. 4, the cylinder block 37 is connected to the upper case half body 38 in an inclined manner to be directed upwardly and forwardly in the direction of travel of the motorcycle. The cylinder block 37 is provided with four cylinder bores 51 arranged in a direction along an axis of the crank shaft 50. Pistons 52, which are slidably fit into the respective cylinder bores 51, are connected to crank pins 50a, which the crank shaft 50 has, through connecting rods 53, respectively.

The crank case 36, mounted on the motorcycle, is provided with first to sixth journal walls 54 to 59 arranged to be spaced from one another in a direction along the axis of the crank shaft 50 from the left side to the right side. The crank shaft 50 is rotatably supported by the first to sixth journal walls 54 to 59.

A rotor 60 is fixed to an end portion of the crank 50 projected outwardly from a left side wall of the crank 36, that is, the first journal wall 54. A stator 61, which forms a generator 62 together with the rotor 60, is attached to a motor cover 63, which is fastened to the left side wall of the crank case 36, in such a way to cover the generator 62.

Figure 5:
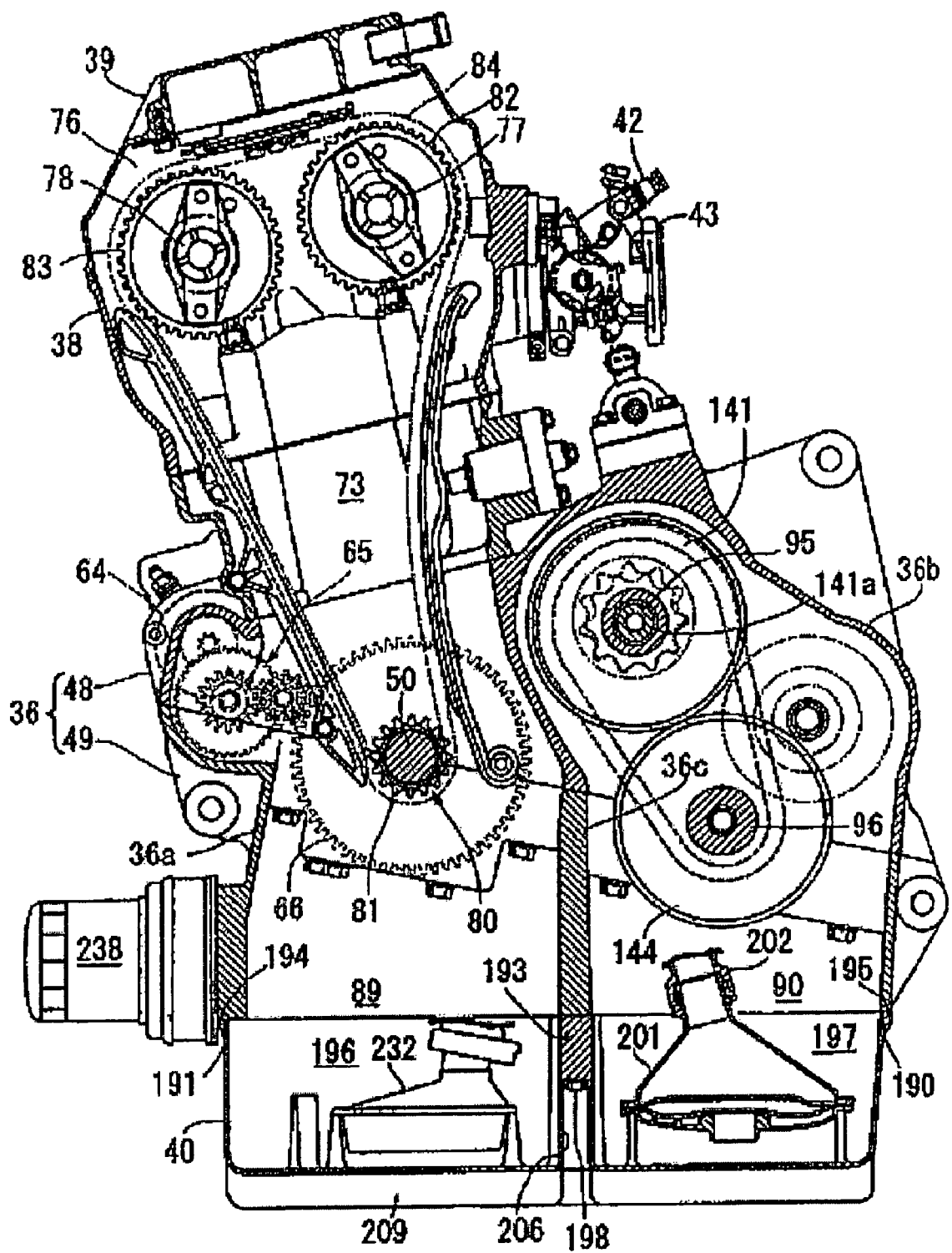
FIG. 5 is a cross-sectional view taken along the line of 5-5 in FIG. 4.

With reference to FIG. 5, in the crank case 36 in the generator cover 63, a start motor 64 having an axis of rotation parallel to the crank shaft 50 is supported, and between a gear 66 by which power is transmitted from the start motor 64 through a reduction gear mechanism 65 and the rotor 60 of the generator 62 there is provided a one-way clutch 67 that allows power transmission from the gear 66.

Moreover, as illustrated in FIG. 4, a pulsar 68 is fixed to an end portion of the crank 50 projecting outwardly from a right side wall of the crank case 36, more specifically, the sixth journal wall 59. In an interior of a pulsar cover 69 connected to the crank case 36 to cover the pulsar 68 there is provided a rotation sensor 70 to be opposed to an outer periphery of the pulsar 68.

The third and fourth journal walls 56 and 57 are arranged to be close to each other without placing the cylinder bore 51 therebetween. A chain chamber 73, which is a portion corresponding to a portion between the third and fourth journal walls 56 and 57, is formed in the cylinder block 37 and the cylinder head 38.

In addition, in the cylinder head 38, there are provided a pair of suction valves 74 for each cylinder and a pair of exhaust valves 75 for each cylinder to be openable and closable while being spring urged in a valve-closing direction. In a valve chamber 76 formed between the cylinder head 38 and the head cover 39 there is contained a valve gear 79, which includes a suction-side camshaft 77 placed to be parallel to the crank shaft 50 according to each suction value 74 and an exhaust-side camshaft 78 placed to be parallel to the crank shaft 50 according to each of exhaust values 75, in such a way to open and close the respective suction valves 74 and exhaust valves 75.

Rotational power is transmitted to the suction-side camshaft 77 and the exhaust-side camshaft 78 from the crank shaft 50 by timing drive means 80 at a reduction ratio of ½. The timing drive means 80 is composed of a drive sprocket 81 mounted on the crank shaft 50 between the third and fourth journal walls 56 and 57, driven sprockets 82 and 83, which are mounted on the suction-side camshaft 77 and the exhaust-side camshaft 78, respectively, at the position corresponding to the drive sprocket 81, and an endless timing chain 84, which is allowed to run in the chain chamber 73 and is wound around the drive sprocket 81 and the driven sprockets 82 and 83.

Figure 6:
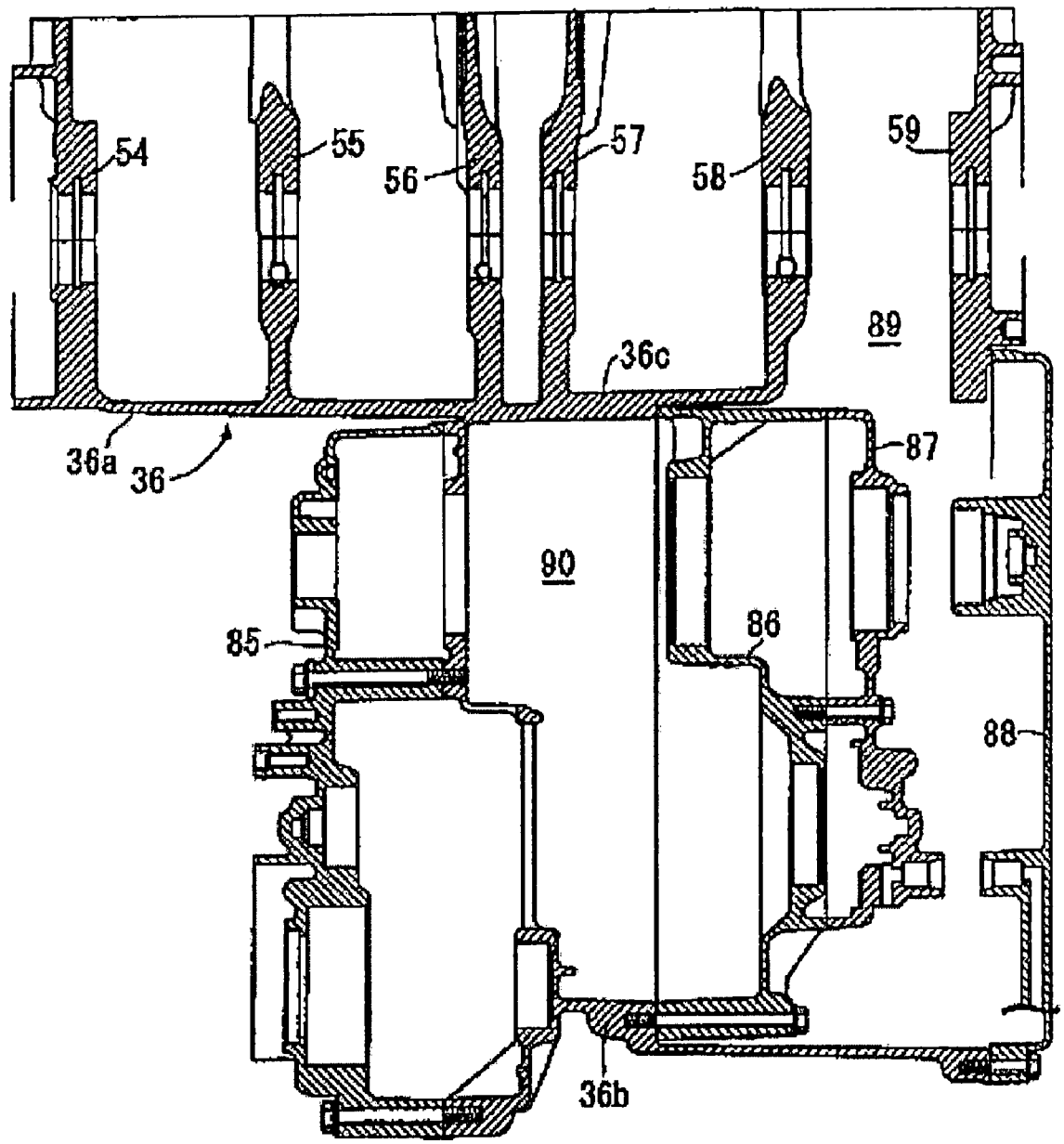
FIG. 6 is a cross-sectional view illustrating a crank case and a cover member.

With reference to FIG. 6, the crank case 36 has a first half portion 36a where the first to sixth journal walls 54 to 59 are formed and a second half portion 36b, which has a right end portion flush with a right end portion of the first half portion 36a and a left end portion being positioned inner than a left end portion of the first half portion 36a and a width being narrower than that of the first half portion 36a in a direction along the axis of the crank shaft 50. A left cover member 85 is connected to the second half portion 36b from the left side. A first right cover member 86 is connected thereto from the right side. In addition, a second right cover member 87 is connected to the first right cover member 86 from the right side, and a third right cover member 88, which covers the second right cover member 87 from the right outside position, is connected to the first half portion 36a and the second half portion 36b of the crank case 36.

In the crank case 36 there are provided a crank chamber 89, which contains the major part of the crank shaft 50 and which communicates with the cylinder bores, and a continuously variable transmission chamber 90, which is formed of the crank case 36. The left cover member 85 is connected to the crank case 36, the first right cover member 86 and the second right cover member 87, and the crank case 36 has a division wall portion 36c, which is placed at a continuously-connecting portion between the first half portion 36a and the second half portion 36b which divide the crank chamber 89 and the continuously variable transmission chamber 90.

Figure 7:
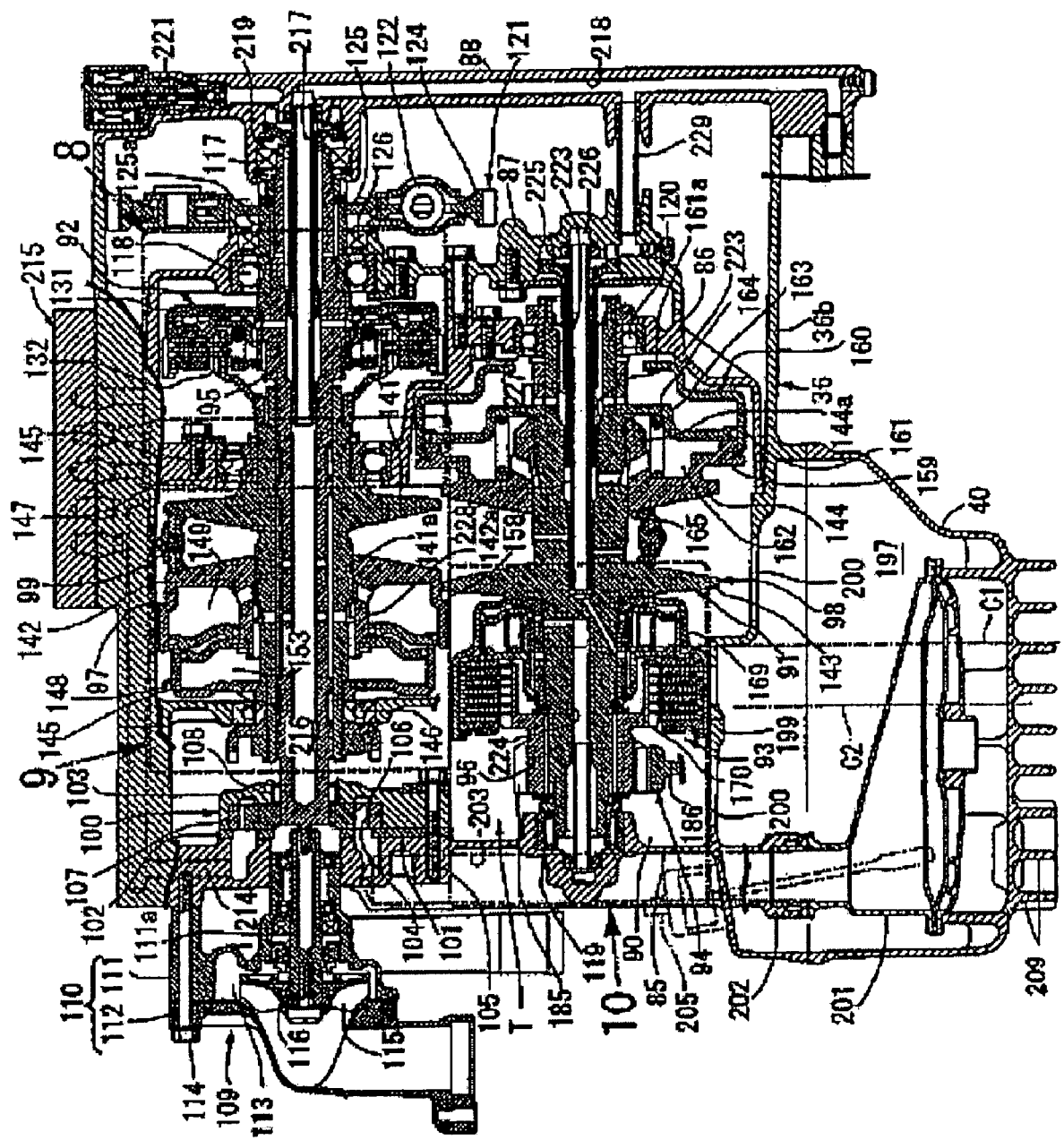
FIG. 7 is an enlarged cross-sectional view taken along the line of 7-7 in FIG. 2.

In FIG. 7, a power transmission device T including a continuously variable transmission 91 is contained in the continuously variable transmission chamber 90. The power transmission device T includes a belt-type continuously variable transmission 91 that allows variable speed by oil pressure control, an input clutch 92 provided between the crank shaft 50 and the continuously variable transmission 91, an output shaft 28 project outwardly from the right cover member 85 to transmit power to the rear wheel WR. A start clutch 93 is provided between the continuously variable transmission 91 and the output shaft 28, and a gear transmission mechanism 94.

The continuously variable transmission 91 has a drive pulley shaft 95 and a driven pulley shaft 96 that are parallel to the crank shaft 50, a drive pulley 97 mounted on the drive pulley shaft 95, a driven pulley 98 mounted on the driven pulley shaft 96, and an endless belt 99 that is wound around the drive pulley 97 and the driven pulley 98, and is positioned more backward than the axis of the crank shaft 50.

The drive pulley shaft 95 rotatably passes through the second half portion 36b of the crank case 36, the first right cover member 86 and the second right cover member 87. On the other hand, the driven pulley shaft 96 rotatably passes through the second half portion 36b of the crank case 36 and the first right cover member 86.

In addition, an outer wall of the continuously variable transmission chamber 90 is formed of the second half portion 36b of the crank case 36, the left cover member 85, the first right cover member 86 and the second cover member 87. However, on the left cover member 85 serving as a wall portion of one end side of the drive pulley shaft 95, there is provided a first oil pump 100 in such a way that one end of the drive pulley shaft 95 is connected thereto.

The first oil pump 100 is a trochoid pump, and a pump case 101 for the first oil pump 100 includes the left cover member 85, a plate-like first case member 102 abutting against an inner surface of the left cover member 85 and a bowl-like second case member 103, which forms a first pump room 104 between the first case member 102 and itself, and which sandwiches the first case member 102 between the left cover member 85 and itself. The first and second case members 102 and 103 are fastened together to the left cover member 85 by a plurality of bolts 105.

One end of the drive pulley shaft 95 rotatably passes through the second case member 103 in the pump case 101 to enter into the first pump room 104. Also, one end of the drive pulley shaft 95 is relatively unrotatably connected to an inner rotor 106 among the inner rotor 106 and an outer rotor 107, which are meshed together and contained in the first pump room 104. A roller bearing 108 is interposed between the second case member 103 and the drive pulley shaft 95.

Further, a water pump 109, which is coaxial with the first oil pump 100, is provided on an outer surface side of the left cover member 85 that is a portion corresponding to the first oil pump 100. A pump case 110 for the water pump 109 includes a third case member 111, which has a cylindrical support trunk portion 111a as one body that extends coaxially with the drive pulley shaft 95, and which liquid-tightly inserts its part into the left cover member 85 and a fourth case member 112, which forms a second pump room 113 between the third case member 111 and itself to be connected to the third case member 111. The third and fourth case members 111 and 112 are fastened together to the left cover member 85 by a plurality of bolts 114.

An impeller 115 contained in the second pump room 113 is fixed to one end of a pump shaft 116. This pump shaft 116 is liquid-tight and rotatably inserted into the support cylinder 111a. One end of the drive pulley shaft 95 is coaxially and relatively unrotatably connected to the other end of the pump shaft 116.

On the other hand, the other end of the drive pulley shaft 95 is inserted into the third right cover member 88 through an annular seal member 117. A ball bearing 118 is interposed between the drive pulley shaft 95 and the second right cover member 87.

One end of the driven pulley shaft 96 is rotatably supported by the left cover member 85 through a roller bearing 119. The other end of the driven pulley shaft 96 rotatably passes through the first right cover member 86. A ball bearing 120 is interposed between the driven pulley shaft 96 and the first right cover member 86.

Rotational power is transmitted to the drive pulley shaft 95 from the crank shaft 50 through a primary reduction gear mechanism 121 and a dumper spring 122. The primary reduction gear mechanism 121, which reduces rotational power of the crank shaft 50 to transmit to the drive pulley shaft 95, is composed of a primary driving gear 123 mounted on the crank shaft 50 and a primary driven gear 124 meshing with the primary driving gear 123. As illustrated in FIG. 4, the primary driving gear 123 is placed between the fifth and sixth journal walls 58 and 59 to be formed on the crank shaft 50 as one body. On the other hand, a transmission member 125 having a cylindrical portion 125a, which coaxially surrounds the drive pulley shaft 95, is fixed to the drive pulley shaft 95 between the second and third right cover members 87 and 88. The primary driven gear 124 is supported by the transmission member 125 to be relatively rotatable in a limited range. The damper spring 122 is provided between the primary driven gear 124 and the transmission member 125. Moreover, an annular seal member 126 is interposed between the cylindrical portion 125a of the transmission member 125 and the second right cover member 87.

Figure 8:
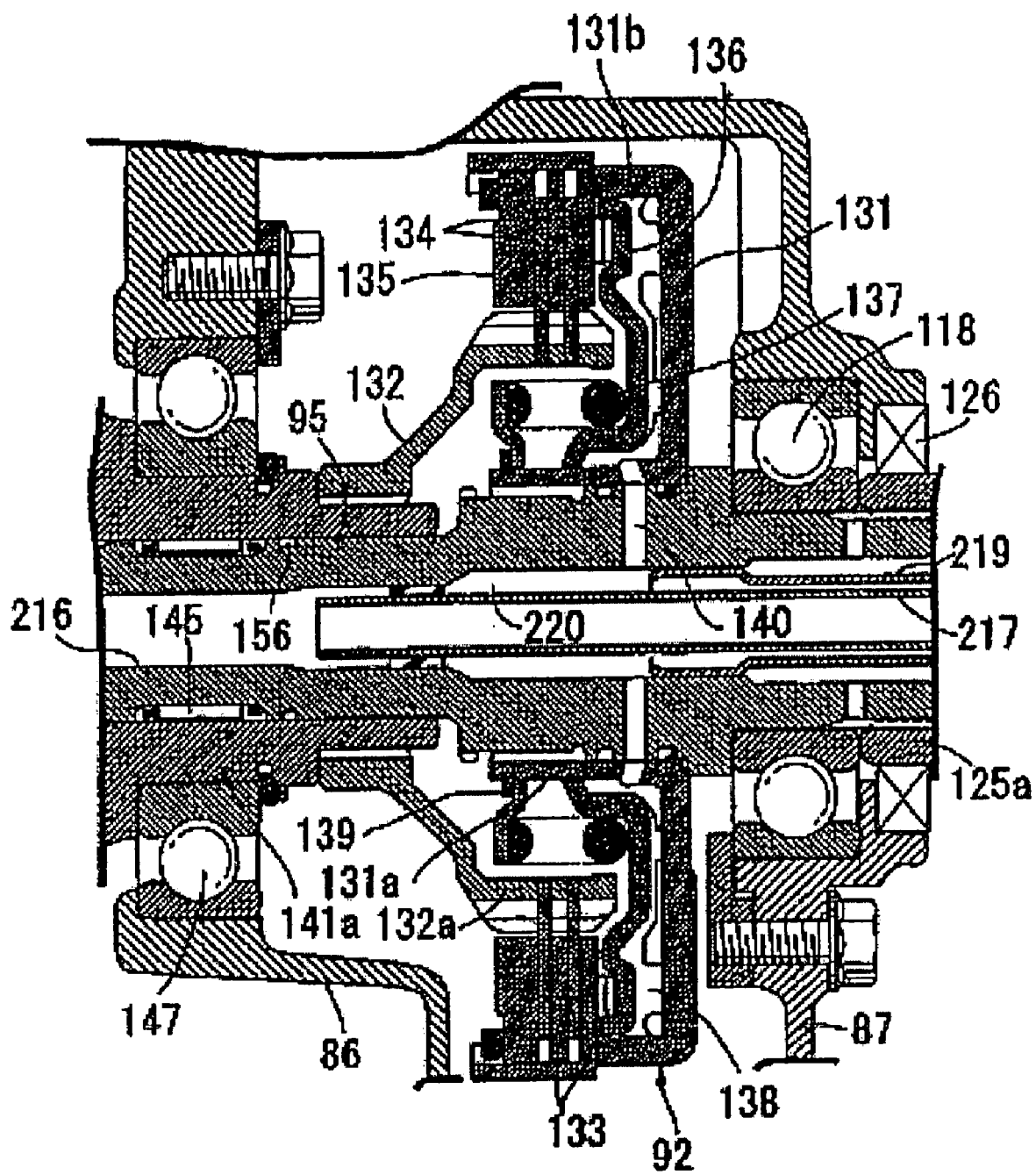
FIG. 8 is an enlarged view of the arrow 8 portion in FIG. 7.

In FIG. 8, the input clutch 92 is attached to the drive pulley shaft 95 between the first and second right cover members 86 and 87 in the continuously variable transmission chamber 90. This input clutch 92 includes a clutch outer 131 having a cylindrical inner trunk portion 131a, which is relatively unrotatably connected to the drive pulley shaft 95 and an outer cylindrical portion 131b, which coaxially surrounds the inner trunk portion 131a. A clutch inner 132 having a cylindrical portion 132a is coaxially disposed between the inner cylindrical portion 132a and the outer cylindrical portion 131b of the clutch outer 131. A plurality of first driving friction plates 133, are spline inserted into the outer cylindrical portion 131b of the clutch outer 131 to be slidable in an axial direction. A plurality of first driven friction plates 134, each of which is alternately piled on each of the plurality of the first driving friction plates 133, are spline inserted into the outer cylindrical portion 132a of the clutch inner 132 to be slidable in an axial direction. A pressure receiving plate 135 is fixed to the outer cylindrical portion 131b of the clutch outer 131 to be opposed to the first driving friction plates 133 and the first driven friction plates 134 that are alternately piled on each other from one axial direction. A pressure plate 136 is opposed to the first driving friction plates 133 and the first driven friction plates 134 that are alternately piled on each other from the other axial direction. A clutch spring 137 is urged to the side where the pressure plate 136 is separated from the pressure receiving plate 135.

The pressure plate 136 forms a first hydraulic chamber 138 between the clutch outer 131 and itself, and is supported to be slidable to the inner cylindrical portion 131a and the outer cylindrical portion 131b of the clutch outer 131. The clutch spring 137 is provided in a contracted manner between a spring receiving member 139 and the pressure plate 136 that are attached to the inner cylindrical portion 131a of the clutch outer 131. Moreover, a first oil hole 140 communicating with the first hydraulic chamber 138 is formed on the drive pulley shaft 95.

The input clutch 92 is turned on, when the pressure plate 136 is moved forward to the pressure receiving plate 135 against the spring force of the clutch spring 137 by an increase in oil pressure of the first hydraulic chamber 138. Thus, the first driving friction plates 133 and the first driven friction plates 134 are pressure sandwiched between the pressure plate 136 and the pressure receiving plate 135. Consequently, the state becomes a clutch-on state where power to the clutch inner 132 from the drive pulley shaft 95 is transmitted, while the state becomes a clutch-off state according to a reduction in oil pressure of the first hydraulic chamber 138.

Figure 9:
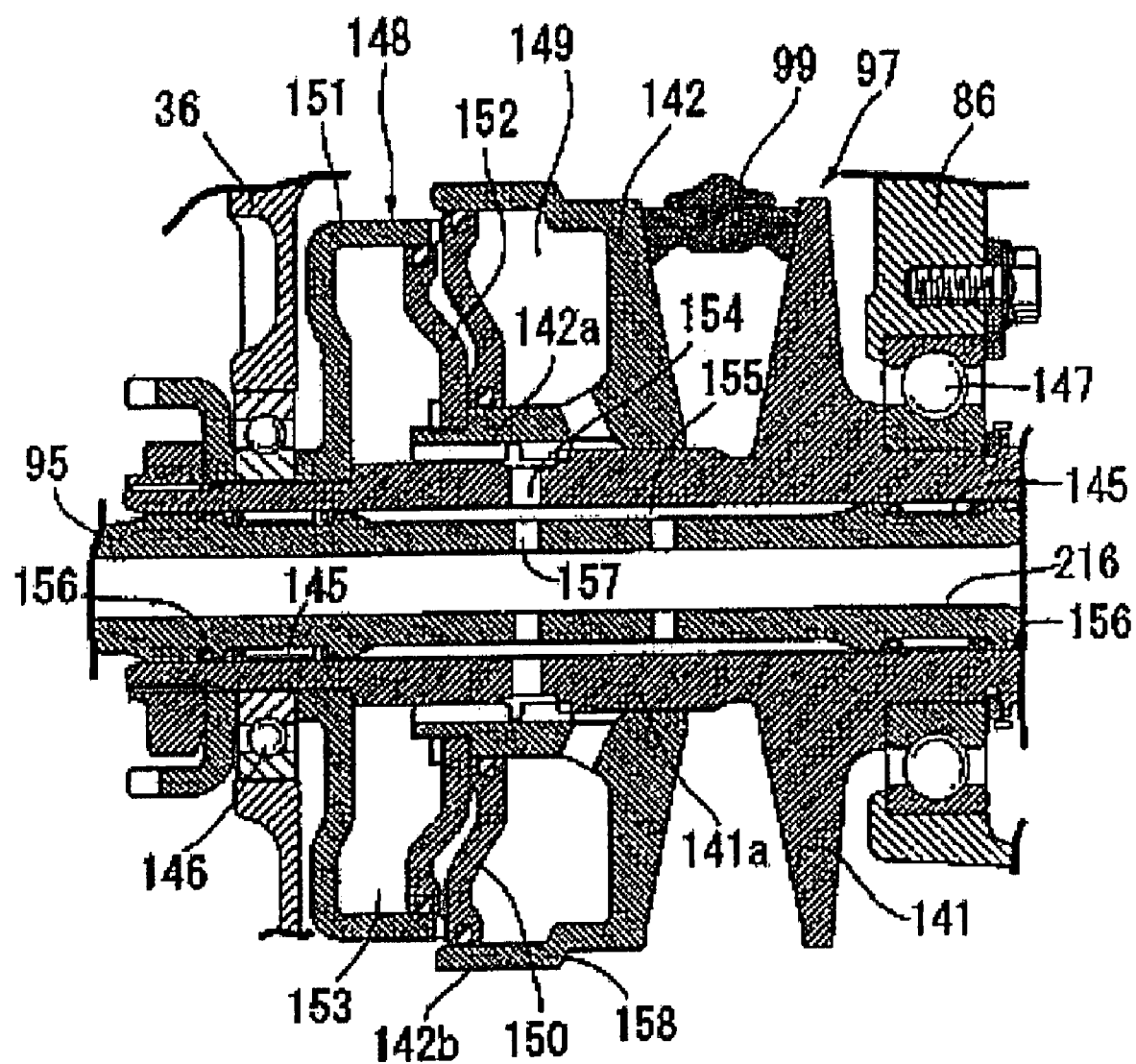
FIG. 9 is an enlarged view of the arrow 9 portion in FIG. 7.

In FIG. 9, the drive pulley 97 includes a drive-side fixed hemi-pulley 141, which has a cylindrical trunk shaft portion 141a as one body that coaxially surrounds the drive pulley shaft 95, and which is relatively rotatably supported by the drive pulley shaft 95. A drive-side movable hemi-pulley 142, which is supported by the cylindrical shaft portion 141a to be slidable in an axial direction while being relatively unrotatable, is opposed to the drive-side fixed pulley hemi-pulley 141. In addition, the driven pulley 98 includes a driven-side fixed hemi-pulley 143, which is formed on the driven pulley shaft 96 as one body and a driven-side movable hemi-pulley 144, which is supported by the driven pulley shaft 96 to be slidable in an axial direction while being relatively unrotatable, and which is opposed to the driven-side fixed pulley hemi-pulley 143.

The belt 99 is wound around the drive pulley 97 and the driven pulley 98. The drive sides of the drive- and driven-side movable hemi-pulleys 142 and 144, and the axial relative positions to the movable-side fixed pulleys 141 and 143 are controlled by oil pressure. Thus, the radius of the belt 99 to be wound around the pulley 97 and the driven pulley 98 is changed, so that power transmission to the driven pulley shaft 96 from the drive pulley shaft 95 continuously varies.

The cylinder shaft portion 141a that the drive-side fixed hemi-pulley 141 has causes a pair of needle bearings 145, 145 to be interposed between the drive pulley shaft 95 and itself so as to coaxially surround the drive pulley shaft 95. One end of the cylinder shaft portion 141a rotatably passes through the left side wall of the second half portion 36b of the crank case 36. A ball bearing 146 is interposed between the cylinder shaft portion 141a and the crank case 36. Further, the cylinder shaft 141a rotatably passes through the first right cover member 86, and is coaxially and relatively unrotatably connected to the clutch inner 132 of the input clutch 92. The cylinder shaft portion 141a, that is, the drive-side fixed hemi-pulley 141 rotates together with the drive pulley shaft 95 with the input clutch 92 clutched on. In addition, a ball bearing 147 is interposed between the cylinder shaft portion 141a and the first right cover member 86.

The drive-side movable hemi-pulley 142 is placed at a position opposite to the drive-side fixed hemi-pulley 141 from an opposite side to the first right cover member 86, and has a cylindrical first boss portion 142a as one body. This cylindrical first boss portion 142a coaxially surrounds the trunk shaft portion 141a, and is connected to the cylindrical trunk shaft portion 141a relatively unrotatably and axially movably. A drive-side hydraulic drive mechanism 148, which slide drives the drive-side movable hemi-pulley 142, is provided on the cylinder shaft portion 141a at an opposite side to the drive-side fixed hemi-pulley 141 in connection with the drive-side movable hemi-pulley 142.

The drive-side hydraulic drive mechanism 148 includes a cylindrical case portion 142b, which is provided as one body on an outer periphery portion of the drive-side movable hemi-pulley 142 in a connected row arrangement to coaxially surround the first boss portion 142a, and which extends to the opposite side to the drive-side fixed hemi-pulley 141. A ring-plate like first end plate 150 is provided, which slidably comes in contact with an inner periphery of the case portion 142b and an outer periphery of the first boss portion 142a in a liquid-tight manner to form a second oil chamber 149 between the drive-side movable hemi-pulley 142 and itself. A fixed bowl-like member 151 is provided, which is fixed to the cylindrical shaft portion 141a at the opposite side to the drive-side fixed hemi-pulley 142 in connection with the drive-side movable hemi-pulley 142, and which is abutted against the first end plate 150. A second end plate 152 is provide, which is slidably brought in contact with an inner periphery of the fixed bowl-like member 151 in a liquid-tight manner, and which has an inner periphery portion fixed to the first boss portion 142a to form a third oil chamber 153 between the fixed bowl-like member 151 and itself.

A second oil hole 154 communicating with the second and third oil chambers 149 and 153 is provided on the cylinder shaft portion 141a. In addition, an annular room 155 communicating with the second oil hole 154 is formed between the drive pulley shaft 95 and the cylinder shaft portion 141a. A pair of annular seal members 156, 156, which seal both ends of the annular room 155 in an axial direction, is attached to an outer periphery of the drive pulley shaft 95 at the outside of both needle bearings 145, 145. Further, a plurality of third oil holes 157 communicating with the annular room 155 are formed on the drive pulley shaft 95.

By oil pressure power according to oil pressure acting on the second and third oil chambers 149 and 153, the drive-side movable hemi-pulley 142 is urged close to the drive-side fixed hemi-pulley 141 to increase the radius of the belt 99 to be wound around the drive pulley 97.

The driven-side fixed hemi-pulley 143 is formed on the drive-side pulley shaft 96 as one body at a position corresponding to the drive-side movable hemi-pulley 142 of the drive pulley 97. The drive-side movable hemi-pulley 142 and the driven-side fixed hemi-pulley 143 are arranged to be partially overlapped with each other, when seen from a direction along the axis of the drive pulley shaft 95 and that of the driven pulley shaft 96. A clearance concave portion 158 is formed on the outer periphery of the drive-side movable hemi-pulley 142 to prevent the occurrence of mutual interference between the drive-side movable hemi-pulley 142 and the driven-side fixed hemi-pulley 143.

As illustrated in FIG. 7, the driven-side movable hemi-pulley 144 is placed at a position corresponding to the drive-side fixed hemi-pulley 141 of the drive pulley 97. A second boss portion 144a, which is provided as one body on an inner periphery portion of the driven-side movable hemi-pulley 144 in a connected row arrangement to extend to the opposite side to the driven-side fixed hemi-pulley 143, and which coaxially surrounds the driven pulley shaft, is relatively rotatably and axially movably connected to the driven pulley shaft 98.

In addition, the drive-side fixed hemi-pulley 141 and the driven-side movable hemi-pulley 144 are arranged to be partially overlapped with each other as seen from a direction along the axis of the drive pulley shaft 95 and that of the driven pulley shaft 96. A clearance concave portion 159 is formed on the outer periphery of the driven-side movable hemi-pulley 144 to prevent occurrence of mutual interference between the drive-side fixed hemi-pulley 141 and the driven-side movable hemi-pulley 144.

As described above, the clearance concave portion 158 is formed on the outer periphery of the drive-side movable hemi-pulley 142 to prevent occurrence of mutual interference between the drive-side movable hemi-pulley 142 and the driven-side fixed hemi-pulley 143. The clearance concave portion 159 is formed on the outer periphery of the driven-side movable hemi-pulley 144 to prevent occurrence of mutual interference between the drive-side fixed hemi-pulley 141 and the driven-side movable hemi-pulley 144. Thus, the drive pulley shaft 95 and the driven pulley shaft 96 are made close to each other to make the continuously variable transmission 91 compact.

A driven-side oil pressure drive mechanism 160, which slide-drives the driven-side movable hemi-pulley 144, is provided on the driven pulley shaft 96 at the opposite side to the driven-side fixed hemi-pulley 143 in connection with the driven-side movable hemi-pulley 144. This driven-side oil pressure drive mechanism 160 includes a cylindrical case member 161, which coaxially surrounds the second boss portion 144a to have one end fixed to an outer periphery portion of the driven-side movable hemi-pulley 144, and which extends to the opposite side to the driven-side fixed hemi-pulley 143. An end wall member 163 is provided, which slidably comes in contact with an inner periphery of the case member 161 in a liquid-tight manner to form a fourth oil chamber 162 between the driven-side movable hemi-pulley 144 and itself. An inner periphery portion is fixed to the driven pulley shaft 96 and a coil spring 164, which is provided in a contracted manner between the driven-side movable hemi-pulley 144 and the end wall member 163 to prevent the belt 99 from being loosened when the internal combustion engine E is stopped.

A fourth oil hole 165, in communication with the fourth oil pressure chamber, is formed on the driven pulley shaft 96. The driven-side movable hemi-pulley 144 is urged close to the driven-side fixed hemi-pulley 143 to increase the radius of the belt 99 to be wound around the driven pulley 98 by oil pressure power according to oil pressure acting on the fourth oil chamber 162. Moreover, a restriction plate portion 161a, which restricts proximity limit of the driven-side movable hemi-pulley 144 to the driven-side fixed hemi-pulley 143 when abutting against the end wall member 163 from the opposite side to the driven-side fixed hemi-pulley 143, is provided as one body in a connected row arrangement to extend inwardly in a radius direction In FIG. 10, the start clutch 93 is attached to the driven pulley shaft 96 between the driven pulley 98 and the left cover member 85 in the continuously variable transmission 91. This start clutch 93 includes a clutch outer 169 in which a cylindrical boss member 168, which is relatively unrotatably connected to the driven pulley shaft 96, is connected to an inner periphery. A clutch inner 170 is provided, which is coaxially surrounded by the clutch outer 169, and which is relatively rotatably supported through a needle bearing 171 by the driven pulley shaft 96. A plurality of second drive friction plates 172 are provided, which are relatively unrotatably engaged with the clutch outer 169. A plurality of second driven friction plates 173 are provided, which are relatively unrotatably engaged with the clutch inner 170, and each of which is alternately piled on each of a plurality of the second drive friction plates 172. A pressure receiving plate 174 is provided, which is supported in a fixed manner by the clutch outer 169 to be opposed to the second drive and driven friction plates 172 and 173 which are mutually piled up; a piston 175, which sandwiches the second drive and driven friction plates 172 and 173 between the pressure receiving plate 174 and itself, and which forms a fifth oil pressure chamber 176 between the clutch outer 169 and itself; and a spring 177, which urges the piston 175 to the side where volume of the fifth oil pressure chamber 176 is reduced.

An inner periphery portion of the piston 175 is slidably brought into contact with an outer periphery of the boss member 168 in a liquid-tight manner. An outer periphery portion of the piston 175 is slidably brought into contact with the clutch outer 169 in a liquid-tight manner. In addition, a fifth oil hole 178, which communicates with the fifth oil pressure chamber 176, is provided on the driven pulley shaft 96. The piston 175 actuates to pressure sandwich the second drive and driven friction plates 172 and 173 between the pressure receiving plate 174 and itself. Thus, the start clutch 93 is turned into a clutch-on state where rotational power, which is to be transmitted to the clutch outer 169 from the driven pulley shaft 96, is transmitted to the clutch inner 170.

In addition, an inner periphery portion of a wall member 180, which forms a canceller room 179 between the position 175 and itself at an opposite side to the fifth oil pressure chamber 176, is fixed to the boss member 169. The piston 175 is slidably brought in contact with an outer periphery portion of the wall member 180 in a liquid-tight manner. Further, the spring 177 is contained in the canceller room 179 to be interposed between the piston 175 and the wall member 180. Moreover, an oil passage 181, which guides lubricating oil to the canceller room 179, is provided on the driven pulley shaft 96 and the boss member 169. Accordingly, even if centrifugal force caused by rotation acts on oil in the fifth oil pressure chamber 176 under a reduced pressure to cause force that presses the piston 175, the centrifugal force also acts on the oil in the canceller room 179. This prevents the piston 175 from undesirably moving to the side where the second drive and driven friction plates 172 and 173 are sandwiched between the pressure receiving plate 174 and itself.

With attention paid to FIG. 4, one end of the output shaft 28 rotatably passes through the left cover member 85. An annular seal member 182 and a ball bearing 183 are interposed between the output shaft 28 and the left cover member 85 from the outside in order. The drive sprocket 30, which forms part of the chain drive means 33, is fixed to one end of the output shaft 28 projected from the left cover member 85. Moreover, the other end of the output shaft 28 is rotatably supported through a roller bearing 184 by the second half portion 36b of the crank case 36.

The gear transmission mechanism 94 is placed between the crank case 36 and the left cover member 85, while being placed between the clutch inner 170 of the start clutch 93 and the output shaft 28. This gear transmission mechanism 94 includes a drive gear 185, which is formed on the clutch inner 170 as one body and a driven gear 186, which is formed on the output shaft 28 as one body to be engaged with the drive gear 185. Here, rotational power of the driven pulley shaft 96 is transmitted to the output shaft 28 through the gear transmission mechanism 94 in the clutch-on state of the start clutch 93.

Further, the drive pulley shaft 95 passes through the second right cover member 87 provided between the crank chamber 89 and the continuously variable transmission chamber 90 among the second half portion 36b of the crank case 36, which forms the outer wall of the continuously variable transmission chamber 90, the left cover member 85, the first right cover member 86 and the second right cover member 87. However, the annular seal member 126 is interposed between the transmission member 125, which is adhered and fixed to the outer periphery of the drive pulley shaft 95, and the second right cover member 87. The annular seal member 117 is also interposed between the other end of the cylindrical drive pulley 95 and the third right cover member 88. Thus, the continuously variable transmission chamber 90 is liquid-tightly isolated from the crank chamber 89.

Figure 11:
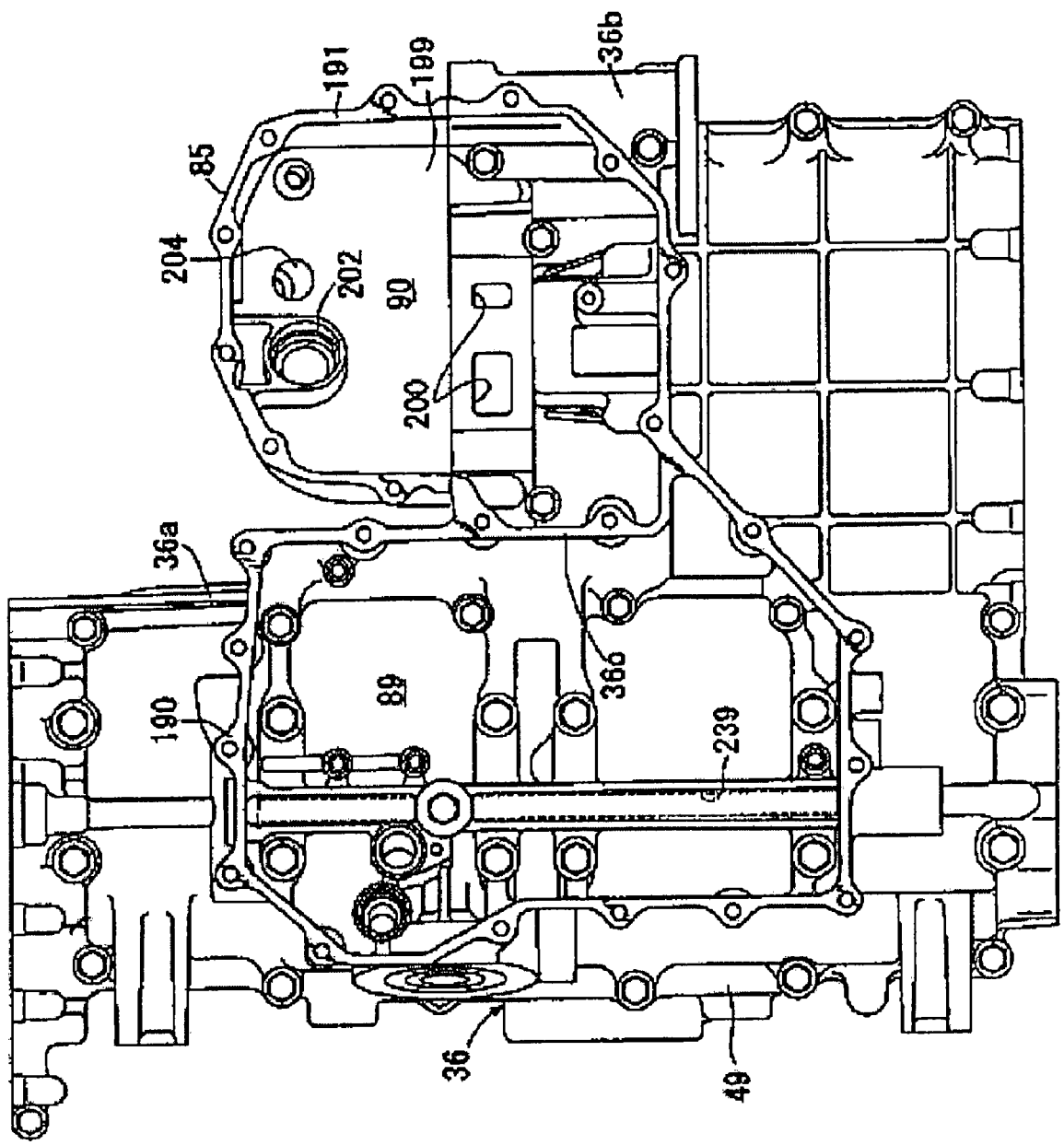
FIG. 11 is a view illustrating a crank case and a left cover member, when seen from the arrow direction 11-11 in FIG. 2.

In FIG. 11, on a lower surface of the first half portion 36a of the lower case half body 49 in the crank case 36, there is formed a first connected surface 190, which is endlessly connected, and which corresponds to the crank chamber 39. On a lower surface of the second half portion 36b of the lower case half body 49 in the crank case 36, and on a lower surface of the right cover member 85 connected to the second half portion 36b, there is formed a second connected surface 191, which is endlessly connected to share part of the first connected surface 190 at the division wall portion 36c, and which corresponds to the continuously variable transmission chamber 90.

Figure 12:
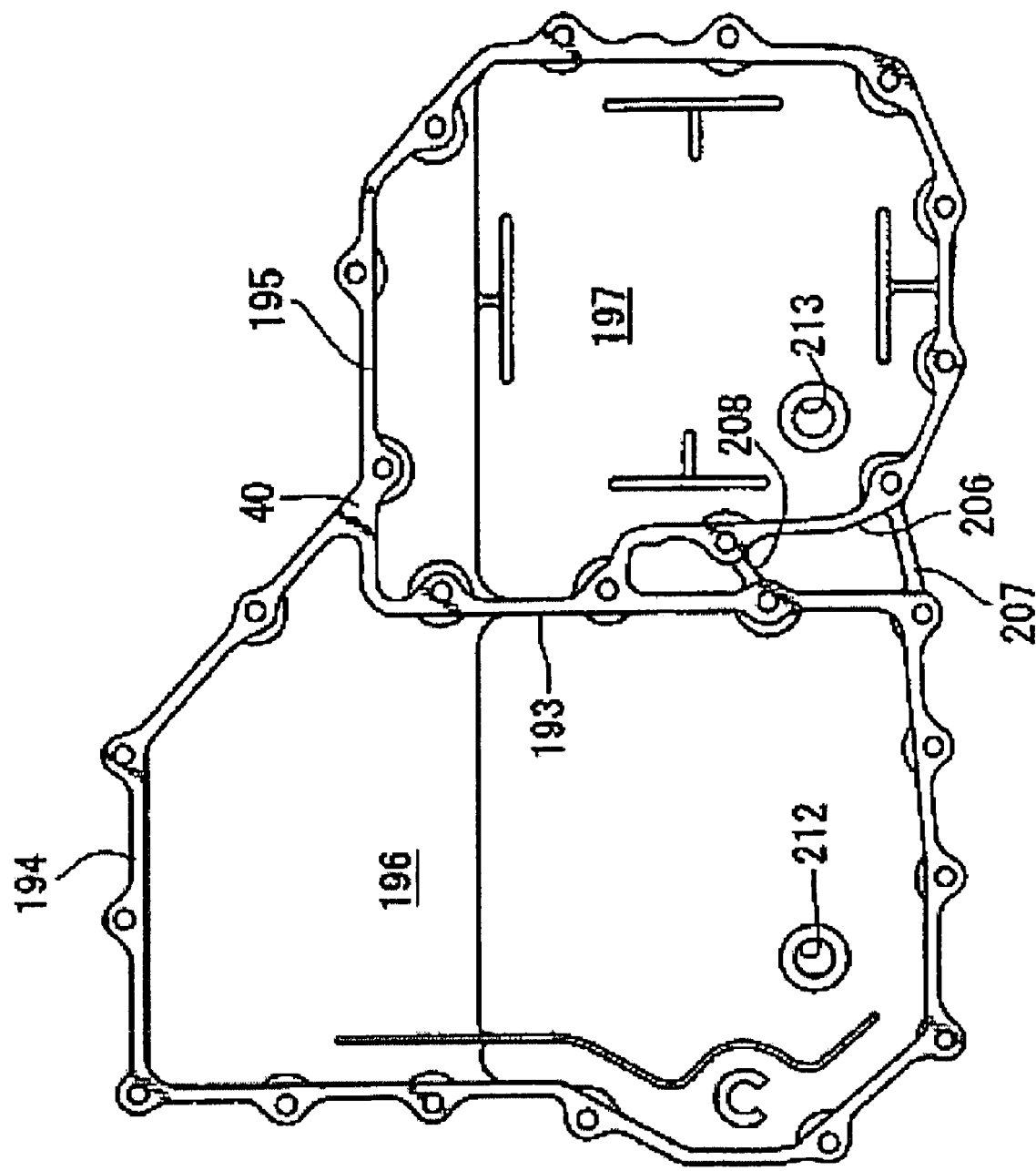
FIG. 12 is a view illustrating an oil pan, when seen from the arrow direction 12-12 in FIG. 2.

With reference to FIG. 12, on the oil pan 40 there is formed a division wall 193 that divides the interior of the oil pan 40 into an internal combustion engine side oil reservoir 196, which reserves oil for each lubrication portion of the internal combustion engine E, and a continuously variable transmission side oil reservoir 197, which reserves oil for lubrication of the power transmission device T including the continuously variable transmission 91, for speed control of the continuously variable transmission 91, and for control of the input clutch 92 and the start clutch 93. On an upper surface of the oil pan 40, there are formed an endless third connected surface 194 connected to the first connected surface 190 of the crank 36 and a fourth connected surface 195, which is endlessly connected to share part of the third connected surface 194 at the portion corresponding to the division wall portion 193 and which is connected to the second connected surface 191 of the left cover member 85.

The oil pan 40 is fastened to the crank case 36 and the left cover member 85 by a plurality of bolts 198 in such a way to connect the third and fourth connected surfaces 194 and 195 to the first and second connected surfaces 190 and 191. The internal combustion engine side oil reservoir 196 is passed through the lower portion of the crank chamber 89.

As illustrated in FIG. 7, on the second half portion 36b of the lower case half body 49 in the crank case 36 and the left cover member 85, there is formed a ceiling wall portion 199, which is interposed between the continuously variable transmission side oil reservoir 197 and the continuously variable transmission chamber 90, in such a way to serve as a ceiling wall for the continuously variable transmission side oil reservoir 197. On this ceiling wall portion 199, there are formed a plurality of through holes 200 that pass through between the continuously variable transmission side oil reservoir 197 and the continuously variable transmission chamber 90. Thus, the continuously variable transmission side oil reservoir 197 is in communication with the continuously variable transmission chamber 90.

The continuously variable transmission side oil reservoir 197 is formed of the lower portion of the left cover member 85, the oil pan 40 and the ceiling wall portion 199. The part of the continuously variable transmission side oil reservoir 197 expands more outwardly than the continuously variable transmission chamber 90 in a width direction of the motorcycle. The lower portion of the left cover member 85 and the left side wall of the oil pan 40 are formed in such a way to expand more outwardly than the upper portion of the left cover member 85 as illustrated in FIG. 7.

The continuously variable transmission side oil reservoir 197 is placed in such a way that the center C2 thereof along the width direction of the motorcycle is shifted to the right or left side from a central line C1 of the vehicle body at the center in the width direction, the left side in this embodiment, namely, it is shifted to the left side from the central line C1 of the vehicle body. The continuously variable transmission side oil reservoir 197 is formed in such way to expand the part thereof more outward than the continuously variable transmission chamber 90 on the shifted side of the continuously variable transmission side oil reservoir 197 from the central line C1 of the vehicle body. Contrary to the continuously variable transmission side oil reservoir 197, the continuously variable transmission 91 is placed in such a way to be shifted to the right side from the central line C1 of the vehicle body.

Figure 13:
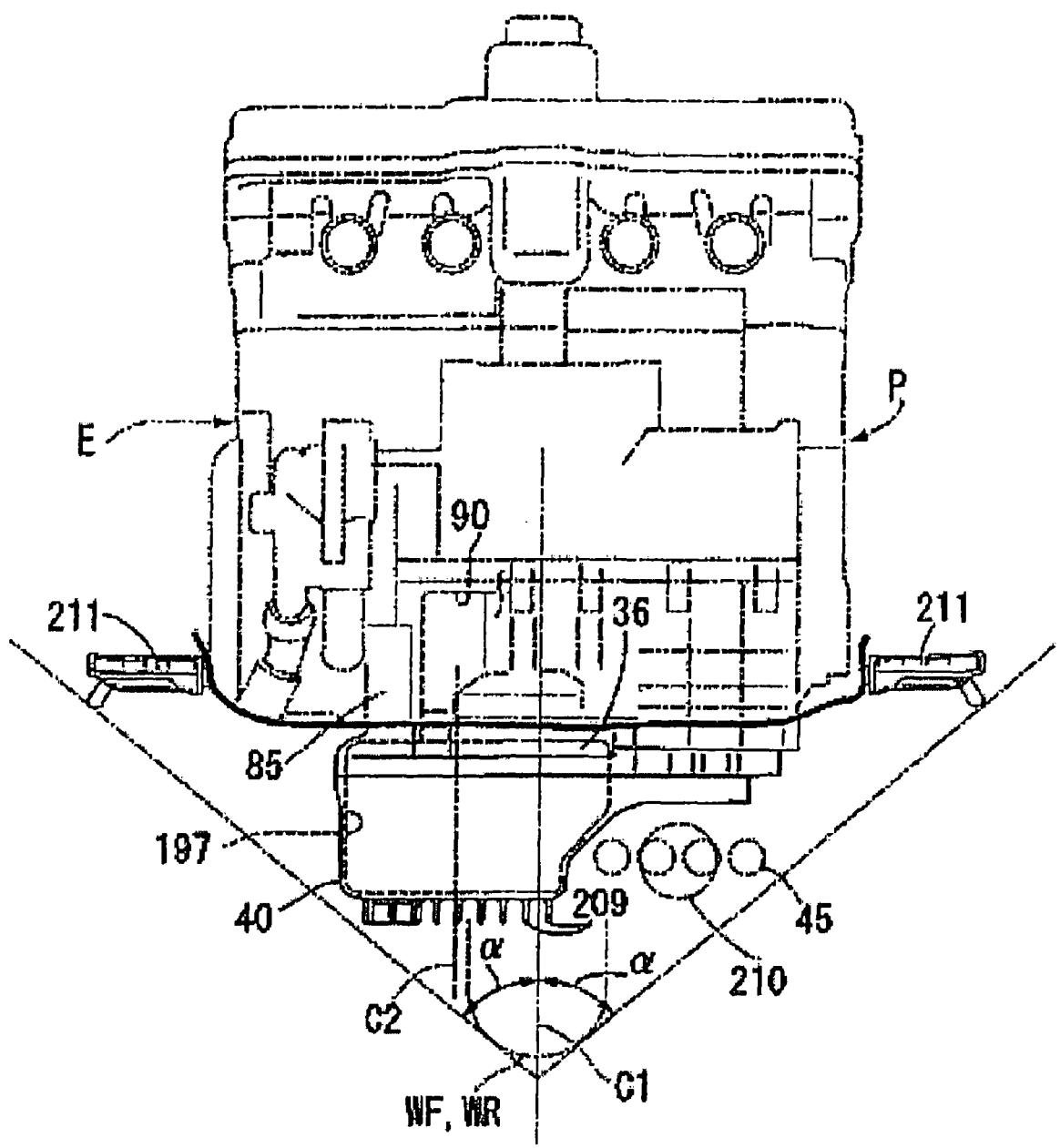
FIG. 13 is a rear view illustrating a power unit, when seen from the rear side.

As mentioned above, the continuously variable transmission side oil reservoir 197 is placed in such a way that the center C2 thereof along the width direction of the motorcycle is shifted to the left side from the central line C1 of the vehicle body. The continuously variable transmission side oil reservoir 197 expands more outwardly than the continuously variable transmission chamber 90 on the shifted side. Thus, as shown in FIG. 13, it is possible to ensure a vacant space at the right side from the central line C1 of the vehicle body and the lower portion of the crank case 36, and there are arranged four exhaust pipes 45 and a collecting exhaust pipe 210 or the like in which these exhaust pipes 45 are collected.

Steps 211, 211, which are formed on the vehicle body frame F or the internal combustion engine E, are arranged on both sides of the motorcycle. A bank angle α of the motorcycle is determined by both the steps 211, 211. However, the continuously variable transmission side oil reservoir 197 is formed in such a way to expand the part thereof more outward (left side in this embodiment) than the continuously variable transmission chamber 90 within the range of the bank angle α.

On the upper portion of the left cover member 85 serving as a wall portion that forms a part of the outer wall of the continuously variable transmission 91, there is provided the first oil pump 100 that pumps up oil from the continuously variable transmission side oil reservoir 197. This continuously variable transmission side oil reservoir 197 reserves oil for lubrication of the power transmission device T including the continuously variable transmission 91, for speed control of the continuously variable transmission 91, and for control of the input clutch 92 and the start clutch 93. The first oil pump 100 is provided in such a way that one end of the drive pulley shaft 95, which forms part of the continuously variable transmission 91, is connected thereto. The continuously variable transmission side oil reservoir 197 is formed in such a way that the part thereof expands more outward than the wall portion where the first oil pump 100 is provided, that is, the upper portion of the left cover member 85.

On the continuously variable transmission side oil reservoir 197, there is provided an oil strainer 201. On a portion of the left cover member 85 of the second half portion 36b of the lower portion case half body 49 in the crank case 36, serving as the ceiling wall of the continuously variable transmission side oil reservoir 197, and the ceiling wall portion 199 formed on the left cover member 85, namely the expanded portion of the continuously variable transmission side oil reservoir 197, there is provided a connecting pipe 202, which leads to the oil strainer 201, to extend downward.

In addition, on the outer side surface of the left cover member 85, a suction oil passage 203, which guides oil of the continuously variable transmission side oil reservoir 197 to the first oil pump 100, is formed to be extended up and down, so that its lower end portion is in communication with the connecting pipe portion 202, which is provided at a portion that expands more outwardly than the continuously variable transmission chamber 90 of the ceiling wall of the continuously variable transmission side oil reservoir 197, and its upper end portion is communicated with the first oil pump 100.

Moreover, on the portion that expands more outwardly than the continuously variable transmission chamber 90 of the ceiling wall portion 199 as the ceiling wall for the continuously variable transmission side oil reservoir 197, there is formed a gauge hole 204 (see FIG. 11) having an axis inclined to be separated from the outer surface of the left cover member 85 as moving upwardly. A level gauge 205 (see FIGS. 2 and 7), which checks an amount of oil reserved in the continuously variable transmission side oil reservoir 197, is detachably fitted into the gauge hole 204.

Figure 14:
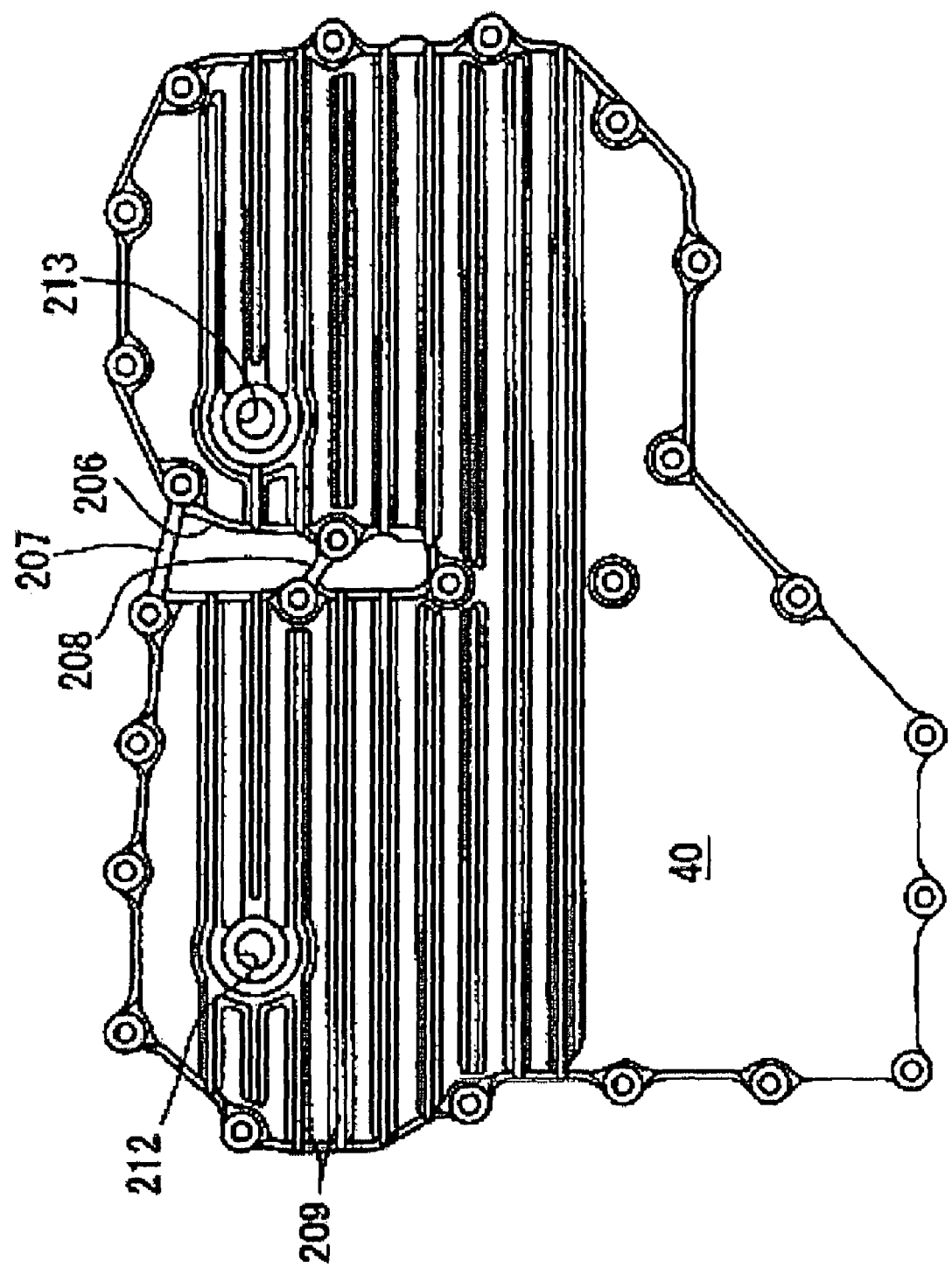
FIG. 14 is a view illustrating an oil pan, when seen from the arrow direction 14 in FIG. 2.

With reference to FIG. 14, a groove 206, which corresponds to a space between the crank case 36 and the left cover member 85, is formed on the oil pan 40. More specifically, this groove 206 is formed on the oil pan 40 at a portion where the division wall 193 is formed so as to be open to one side (left side that is the opposite side to the right side where the exhaust pipes 45 and the collecting exhaust pipe 210 are arranged in this embodiment) and downward. Bridge portions 207 and 208 for reinforcement are formed between both side walls of the groove 206. Furthermore, a plurality of ribs 209, 209, which are arranged in a back and forth direction, are provided on a bottom portion of the oil pan 40 in an extended condition. A drain hole 212, which communicates with the lower portion of the internal combustion engine side oil reservoir 196 is formed on the bottom portion of the oil pan 40. A drain hole 213, which communicates with the lower portion of the continuously variable transmission side oil reservoir 197, is also formed on the bottom portion of the oil pan 40.

As illustrated in FIG. 7, oil discharged from the first oil pump 100 is connected to an oil pressure control device 215 attached to an upper side wall on the rear side of the crank case 36 through a discharge oil passage 214 formed on the left cover member 85 and the crank case 36.

Oil pressure controlled by this oil pressure control device 215 is supplied to the first oil pressure chamber 138 in the input clutch 92, the second and third oil pressure chambers 149 and 153 in the drive-side oil pressure drive mechanism 148, the fourth oil pressure chamber 162 in the driven-side oil pressure drive mechanism 160 and the fifth oil pressure chamber 176 in the start clutch 93.

As illustrated in FIGS. 7 to 9, a first central oil passage 216 with a bottom, which is open to the third right cover member 88, is coaxially provided on the drive pulley shaft 95. A cylindrical first trunk member 217, which communicates with the third oil holes 157, is liquid-tightly and coaxially inserted into the first central oil passage 216. Moreover, an oil passage 218 communicating with the first trunk member 217 is provided on the third right cover member 88 in such a way to guide oil pressure from the oil pressure control apparatus 215. Moreover, a cylindrical second trunk member 219, which forms an annular passage 220 (see FIG. 8) communicating with the first oil hole 140 leading to the first oil pressure chamber 138 in the input clutch 92 between the first trunk member 217 and itself, is coaxially inserted into the first central oil passage 216 in such a way to coaxially surround the first trunk member 217. An electromagnetic control valve 221 (see FIG. 3 and FIG. 7), which switches action of oil pressure discharged from the first oil pump 100 on the annular passage 220 and release thereof, is attached to the third right cover member 88.

As illustrated in FIG. 7, on the driven pulley shaft 96, there are formed a second central oil passage 223 with a bottom, which is open to the third right cover member 88, and a third central oil passage 224 with a bottom, which is open to the left cover member 85. These two oil passages are coaxially formed on the driven pulley shaft 96. A cylindrical third trunk member 225 is coaxially inserted into the second central oil passage 223 from the third right cover member 88 in such a way to communicate with the oil passage 181 leading to the canceller room 179 in the start clutch 93. An oil passage 226 communicating with the third trunk member 225 is provided on the third right cover member 88 in such a way to guide oil from the first oil pump 100.

Further, a cylindrical fourth trunk member 227, which forms an annular oil passage 228 communicating with the fourth oil chamber 162 in the driven-side oil pressure drive mechanism 160 through the fourth oil hole 165 between the third trunk member 225 and itself, is coaxially inserted into the second central oil passage 223 in such a way to coaxially surround the third trunk member 225. A connecting pipe 229, which causes the annular oil passage 228 to be communicated with the oil passage 218 of the third right cover member 88, is provided between the second right cover member 87 and the third right cover member 88.

Figure 10:
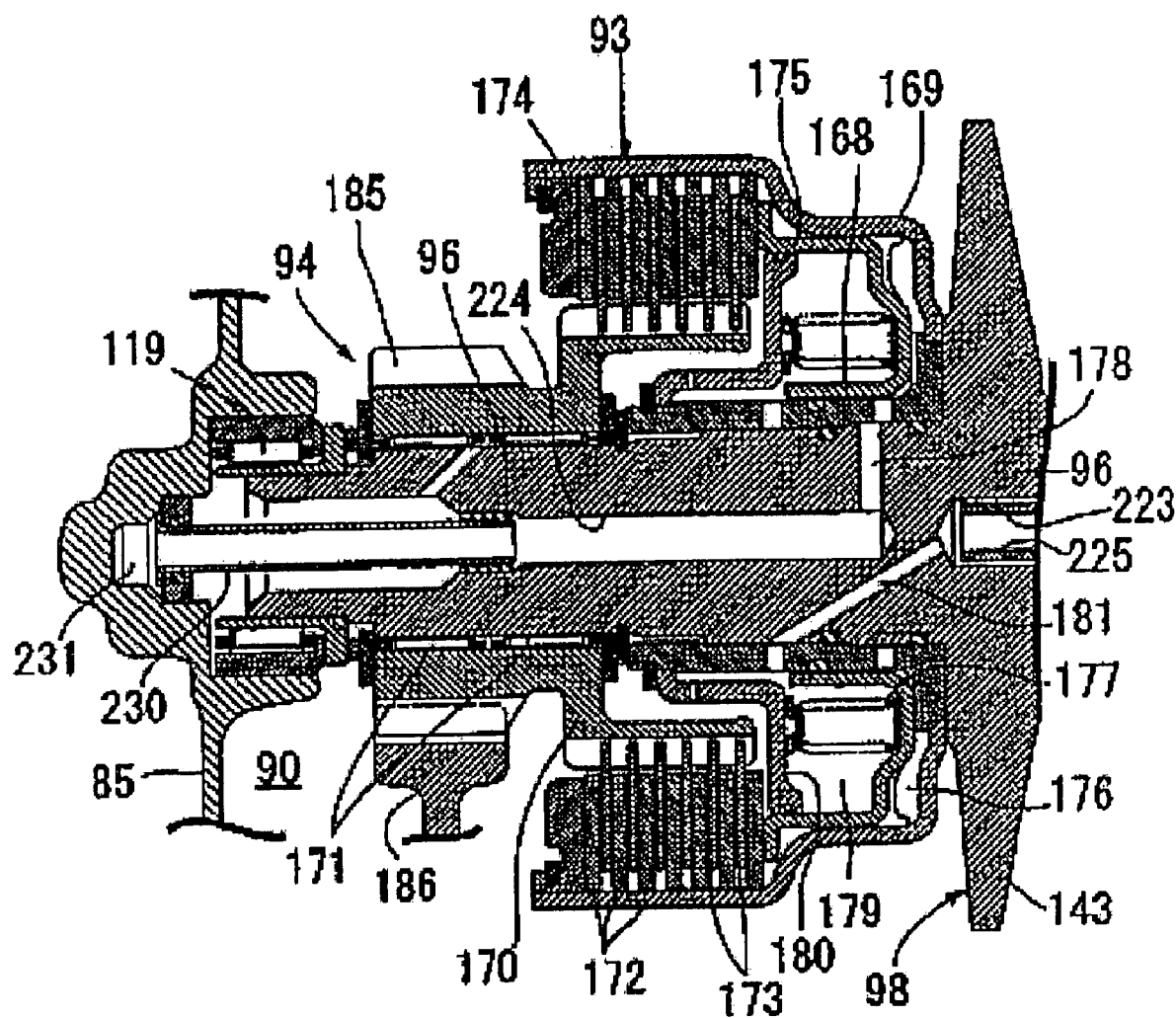
FIG. 10 is an enlarged view of the arrow 10 portion in FIG. 7.

As illustrated in FIG. 10, a cylindrical fifth trunk member 230 is coaxially inserted into the third central oil passage 224 from the left cover member 85 in such a way to communicate with the fifth oil hole 178 leading to the fifth oil pressure chamber 176 in the start clutch 93. An oil passage 231 communicating with the fifth trunk member 230 is provided on the left cover member 85 in such a way to guide oil pressure from the oil pressure control device 215.

As shown in FIG. 5, an oil strainer 232 is provided in the internal combustion engine side oil reservoir 196 of the oil pan 40. A second oil pump 234 (see FIG. 3), which pumps up oil from the internal combustion engine side oil reservoir 196 through the oil strainer 232, supplies oil for lubrication to each lubricating portion of the internal combustion engine E. An endless chine 237 is wound around a drive sprocket 235 mounted on the crank shaft 50 and a driven sprocket 236 on the second oil pump 234, and the second oil pump 234 is driven by power transmission from the crank shaft 50.

The oil discharged from the second oil pump 234 is cleaned through an oil filter 238 attached to the side wall of the front portion of the crank case 36, and thereafter is supplied to a main gallery 239.

An explanation will be next given of the function of this embodiment. The interior of the oil pan 40 to be connected to the crank case 36 is divided into the internal combustion engine side oil reservoir 196 and the continuously variable transmission side oil reservoir 197. The continuously variable transmission chamber 90 liquid-tightly isolated from the crank chamber 89 is in communication with the continuously variable transmission side oil reservoir 197. Thus, an increase in the number of parts is avoided by preventing the number of oils pans 40 from becoming two or more while using oil different between the internal combustion engine E and the continuously variable transmission 91. Thus, an increase in weight of the motorcycle is also avoided, thereby making it possible to contribute to improving the kinematical performance.

Moreover, the division wall 193 formed on the oil pan 40 allows for an increase in the rigidity of the oil pan 40 that tends to increase in size in order to ensure the amount of oil for internal combustion engine E, and that of oil for the continuously variable transmission 91.

Further, if the size of the oil pan 40 is increased downwardly in order to sufficiently ensure the amount of oil, an influence is exerted on the lowest road clearance of the motorcycle. However, the continuously variable transmission side oil reservoir 197 is formed in such a way that the part of the continuously variable transmission side oil reservoir 197 expands more outwardly than the continuously variable transmission chamber 90 in the width direction of the motorcycle. Thus, it is possible to prevent a reduction in the lowest road clearance while ensuring the volume of the oil pan 40 sufficiently and this makes it possible to efficiently place the oil pan 40 in the limited space of the motorcycle.

Moreover, the center C2 of the continuously variable transmission side oil reservoir 197 along the width direction of the motorcycle is located to be shifted to one side of the right and left sides (left side in this embodiment) from the central line C1 of the vehicle body. Also, the continuously variable transmission side oil reservoir 197 expands more outwardly than the continuously variable transmission chamber 90 on the shifted side. Thus, it is possible to ensure the space at the lower portion of the crank case 36 on the other side of the right and left sides (right side in this embodiment) from the central line C1 of the vehicle body and to provide the exhaust pipes 45 and 210 and the like. This makes it possible to prevent the exhaust pipes 45, 210 and the like from expanding outward from the crank case 36 with an increase in size of the oil pan 40, when the size of the oil pan 40 is increased in the width direction of the motorcycle to ensure the capacity.

Moreover, one end of the drive pulley shaft 95 is connected to the first oil pump 100 which is provided on the left cover member 85 serving as the wall portion of the one end side of the drive pulley shaft 95 of the outer wall of the continuously variable transmission chamber 90. The continuously variable transmission side oil reservoir 197 is formed to expand more outwardly than the upper portion of the left cover member 85 on which the first oil pump 100 is provided. Thus, it is possible to share the shaft between the oil pump 100 and the drive pulley 97 to reduce the number of parts. The oil pump 100 is provided on the shaft end of the drive pulley shaft 95 and the wall portion, thereby facilitating assembly. The oil pump 100 is also placed within the width of the continuously variable transmission side oil reservoir 197. Thus, it is possible to simplify the passage connecting between the continuously variable transmission side oil reservoir 197 and the oil pump 100 as a straight line, and to facilitate the formation of the suction oil passage 203.

Moreover, the continuously variable transmission side oil reservoir 197 is formed in such a way to expand more outwardly than the continuously variable transmission chamber 90 within the range of the bank angle α determined by the steps 211 formed on both sides of the motorcycle. Thus, no influence is exerted on the bank angle α, even when the part of the continuously variable transmission side oil reservoir 197 is formed to expand.

Furthermore, the center C2, which is along the width direction of the continuously variable transmission side oil reservoir 197, is located on one side from the central line C1 of the vehicle body. The continuously variable transmission 91 is located at the position shifted to the other side from the central line C1 of the vehicle body. Thus, it is possible to prevent a heavy load from being placed to be shifted to one side in the width direction of the motorcycle.

Moreover, on the portion that expands more outward than the continuously variable transmission chamber 90 of the continuously variable transmission side oil reservoir 197. On the ceiling wall portion 199 of the continuously variable transmission side oil reservoir 197, there is formed the gauge hole 204 into which the level gauge 205 for checking the amount of oil reserved in the continuously variable transmission side oil reservoir 197 is detachably fitted. Thus, it is possible to facilitate insertion and removal of the level gauge 205 without the left cover member 85, which is the wall portion of the continuously variable transmission chamber 90, being treated as an interruption at the time of inserting and removing the level gauge 205. Thus, it is also possible to similarly facilitate operation when oil is supplied to the continuously variable transmission side oil reservoir 197 using the gauge hole 205.

Further, the suction oil passage 203, which guides oil in the continuously variable transmission side oil reservoir 197 to the first oil pump, is formed on the outer side surface of the left cover member 85. At this time, the suction oil passage 203 is also formed from the portion that expands more outward than the continuously variable transmission chamber 90 of the continuously variable transmission side oil reservoir 197 to the oil pipe 100. Thus, there is no need for forming the suction oil passage connecting space between the continuously variable transmission side oil reservoir 197 and the first oil pump 100. As a result, the formation of the suction oil passage 203 is facilitated, and it is also possible to prevent a reduction in degree of freedom of the arrangement of parts in the crank case 36.

Furthermore, on the oil pan 40, there is formed the groove 206 that is open to one side (left side which is opposite to the right side where the exhaust pipes 45 and the collecting exhaust pipe 210 are arranged) and the lower portion. Thus, it is possible to increase a surface area of the oil pan 40, and to improve coolability. The groove 206 is provided to correspond to the division wall 193 that divides the internal combustion engine side oil reservoir 196 and the continuously variable transmission side oil reservoir 197. Thus, it is possible to supply cooling air to substantially the whole circumference of the outer walls of both oil reservoirs 196 and 197, and to obtain a more excellent cooling effect.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle power unit comprising:
an internal combustion engine having an oil pan connected to a lower portion of a crank case that rotatably supports a crank shaft; and
a continuously variable transmission that continuously varies rotational power of the crank shaft to transmit the resultant rotational power to a rear wheel side, wherein a crank chamber that contains the crank shaft is formed in the crank case;
a continuously variable transmission chamber that contains the continuously variable transmission is formed of the crank case and of a cover member connected to the crank case;
the oil pan has a division wall for dividing an interior of the oil pan into an internal combustion engine side oil reservoir that reserves oil for each lubrication portion of the internal combustion engine, and a continuously variable transmission side oil reservoir that reserves oil for lubrication of the continuously variable transmission and for speed control thereof, said division wall being connected to the lower portion of the crank case;
the continuously variable transmission chamber liquid-tightly isolated from the crank chamber is communicated with the continuously variable transmission side oil reservoir; and
the continuously variable transmission side oil reservoir is formed wherein part of the continuously variable transmission side oil reservoir expands more outwardly than the continuously variable transmission chamber in a width direction of the motorcycle.

2. The motorcycle power unit according to claim 1, wherein the continuously variable transmission side oil reservoir is placed to be shifted to any one of right and left sides from a central line of a vehicle body at the center in a width direction of the motorcycle; and
the continuously variable transmission side oil reservoir is formed to expand part of the continuously variable transmission side oil reservoir more outwardly than the continuously variable transmission chamber at the shifted side from the central line of the vehicle body.

3. The motorcycle power unit according to claim 2, wherein the continuously variable transmission includes a drive pulley mounted on a drive pulley shaft to which rotational power from the crank shaft is transmitted, a driven pulley mounted on a driven pulley shaft having an axis parallel to the drive pulley shaft and a belt wound around the drive pulley and the driven pulley;
the continuously variable transmission is configured wherein a radius of the belt to be wound around the drive pulley and the driven pulley is changed, so that power transmission to the driven pulley shaft from the drive pulley shaft is continuously varied;
an oil pump connected to one end of the drive pulley shaft is provided on a wall portion of one end side along an axial direction of the drive pulley shaft, of an outer wall of the continuously variable transmission chamber, in such a way to pump up oil in the continuously variable transmission side oil reservoir; and
the continuously variable transmission side oil reservoir is formed to expand part of the continuously variable transmission side oil reservoir more outwardly than the wall portion on which the oil pump is provided.

4. The motorcycle power unit according to claim 3, wherein a suction oil passage, which guides oil in the continuously variable transmission side oil reservoir to the oil pump, is formed on an outer side surface of the wall portion of the outer wall of the continuously variable transmission chamber, and
the suction oil passage is also formed from the portion that expands more outwardly than the continuously variable transmission chamber of the continuously variable transmission side oil reservoir, to the oil pipe.

5. The motorcycle power unit according to claim 1, wherein the continuously variable transmission includes a drive pulley mounted on a drive pulley shaft to which rotational power from the crank shaft is transmitted, a driven pulley mounted on a driven pulley shaft having an axis parallel to the drive pulley shaft and a belt wound around the drive pulley and the driven pulley;

the continuously variable transmission is configured wherein a radius of the belt to be wound around the drive pulley and the driven pulley is changed, so that power transmission to the driven pulley shaft from the drive pulley shaft is continuously varied;

an oil pump connected to one end of the drive pulley shaft is provided on a wall portion of one end side along an axial direction of the drive pulley shaft, of an outer wall of the continuously variable transmission chamber, in such a way to pump up oil in the continuously variable transmission side oil reservoir; and the continuously variable transmission side oil reservoir is formed to expand part of the continuously variable transmission side oil reservoir more outwardly than the wall portion on which the oil pump is provided.

6. The motorcycle power unit according to claim 5, wherein a suction oil passage, which guides oil in the continuously variable transmission side oil reservoir to the oil pump, is formed on an outer side surface of the wall portion of the outer wall of the continuously variable transmission chamber, and the suction oil passage is also formed from the portion that expands more outwardly than the continuously variable transmission chamber of the continuously variable transmission side oil reservoir, to the oil pipe.

7. The motorcycle power unit according to claim 1, wherein the continuously variable transmission side oil reservoir is formed to expand its part more outwardly than the continuously variable transmission chamber within the range of a bank angle, which is determined by steps formed on both sides of the motorcycle.

8. The motorcycle power unit according to claim 1, wherein the continuously variable transmission side oil reservoir is formed on the rear wheel side of the division wall of the oil pan.

9. The motorcycle power unit according to claim 1, wherein the continuously variable transmission chamber is isolated from the crank chamber by a division wall portion of the crankcase and the division wall of the oil pan which abut together.

10. The motorcycle power unit according to claim 1, wherein the center of the continuously variable transmission side oil reservoir along a width direction of the motorcycle is located on one side from a central line of the vehicle body at the center along the width direction thereof; and the continuously variable transmission is placed at a position shifted to other side from the central line of the vehicle body.

11. The motorcycle power unit according to claim 1, wherein a gauge hole, which allows a level gauge for checking an amount of oil reserved in the continuously variable transmission side oil reservoir to be detachably fitted into a ceiling wall portion of the continuously variable transmission side oil reservoir, is formed on a portion that expands more outwardly than the continuously variable transmission chamber of the continuously variable transmission side oil reservoir.

12. The motorcycle power unit according to claim 1, wherein a groove, which is open to one side and the lower portion of the oil pan, is formed on the oil pan, at a portion where the division wall is formed.

13. A power unit including an internal combustion engine having an oil pan connected to a lower portion of a crank case that rotatably supports a crank shaft; and a continuously variable transmission that continuously varies rotational power of the crank shaft to transmit the resultant rotational power to a rear wheel side, wherein a crank chamber that contains the crank shaft is formed in the crank case, a continuously variable transmission chamber for containing the continuously variable transmission is formed of the crank case and of a cover member connected to the crank case comprising:

a division wall formed in the oil pan for dividing an interior of the oil pan into an internal combustion engine side oil reservoir that reserves oil for each lubrication portion of the internal combustion engine and a continuously variable transmission side oil reservoir that reserves oil for lubrication of the continuously variable transmission and for speed control thereof, said division wall being connected to the lower portion of the crank case;

the continuously variable transmission chamber liquid-tightly isolated from the crank chamber is in communication with the continuously variable transmission side oil reservoir; and the continuously variable transmission side oil reservoir is formed wherein part of the continuously variable transmission side oil reservoir expands more outwardly than the continuously variable transmission chamber in a width direction of a vehicle body.

14. The power unit according to claim 13, wherein the continuously variable transmission side oil reservoir is placed to be shifted to any one of right and left sides from a central line of the vehicle body at the center in a width direction of the vehicle body; and the continuously variable transmission side oil reservoir is formed to expand part of the continuously variable transmission side oil reservoir more outwardly than the continuously variable transmission chamber at the shifted side from the central line of the vehicle body.

15. The power unit according to claim 14, wherein the continuously variable transmission includes a drive pulley mounted on a drive pulley shaft to which rotational power from the crank shaft is transmitted, a driven pulley mounted on a driven pulley shaft having an axis parallel to the drive pulley shaft and a belt wound around the drive pulley and the driven pulley;

the continuously variable transmission is configured wherein a radius of the belt to be wound around the drive pulley and the driven pulley is changed, so that power transmission to the driven pulley shaft from the drive pulley shaft is continuously varied;

an oil pump connected to one end of the drive pulley shaft is provided on a wall portion of one end side along an axial direction of the drive pulley shaft, of an outer wall of the continuously variable transmission chamber, in such a way to pump up oil in the continuously variable transmission side oil reservoir; and the continuously variable transmission side oil reservoir is formed to expand part of the continuously variable transmission side oil reservoir more outwardly than the wall portion on which the oil pump is provided.

16. The power unit according to claim 13, wherein the continuously variable transmission includes a drive pulley mounted on a drive pulley shaft to which rotational power from the crank shaft is transmitted, a driven pulley mounted on a driven pulley shaft having an axis parallel to the drive pulley shaft and a belt wound around the drive pulley and the driven pulley;

the continuously variable transmission is configured wherein a radius of the belt to be wound around the drive pulley and the driven pulley is changed, so that power transmission to the driven pulley shaft from the drive pulley shaft is continuously varied;

an oil pump connected to one end of the drive pulley shaft is provided on a wall portion of one end side along an axial direction of the drive pulley shaft, of an outer wall of the continuously variable transmission chamber, in such a way to pump up oil in the continuously variable transmission side oil reservoir; and the continuously variable transmission side oil reservoir is formed to expand part of the continuously variable transmission side oil reservoir more outwardly than the wall portion on which the oil pump is provided.

17. The power unit according to claim 13, wherein the continuously variable transmission side oil reservoir is formed to expand its part more outwardly than the continuously variable transmission chamber within the range of a bank angle, which is determined by steps formed on both sides of the vehicle.

18. The power unit according to claim 13, wherein the continuously variable transmission side oil reservoir is formed on the rear wheel side of the division wall of the oil pan.

19. The power unit according to claim 13, wherein the continuously variable transmission chamber is isolated from the crank chamber by a division wall portion of the crankcase and the division wall of the oil pan which abut together.

20. The power unit according to claim 13, wherein the center of the continuously variable transmission side oil reservoir along a width direction of the vehicle is located on one side from a central line of the vehicle body at the center along the width direction thereof; and the continuously variable transmission is placed at a position shifted to other side from the central line of the vehicle body.

* * * * *